United States Patent
Chavva et al.

(10) Patent No.: US 11,973,708 B2
(45) Date of Patent: Apr. 30, 2024

(54) METHOD AND APPARATUS FOR REPORTING CHANNEL STATE INFORMATION

(71) Applicant: Samsung Electronics Co., Ltd., Suwon-si (KR)

(72) Inventors: Ashok Kumar Reddy Chavva, Karnataka (IN); Shubham Khunteta, Karnataka (IN); Sripada Kadambar, Bangalore (IN); Anirudh Reddy Godala, Bangalore (IN); Vaishal Tijoriwala, Bangalore (IN); Venkata Ratnakar Rao Rayavarapu, Bangalore (IN); Naga Santha Mohan Rao Goli, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 566 days.

(21) Appl. No.: 17/269,137

(22) PCT Filed: Apr. 16, 2020

(86) PCT No.: PCT/KR2020/005119
§ 371 (c)(1),
(2) Date: Feb. 17, 2021

(87) PCT Pub. No.: WO2020/213964
PCT Pub. Date: Oct. 22, 2020

(65) Prior Publication Data
US 2021/0351885 A1    Nov. 11, 2021

(30) Foreign Application Priority Data

Apr. 16, 2019  (IN) .............................. 201941015348
Apr. 15, 2020  (IN) .............................. 2019 41015348

(51) Int. Cl.
*H04B 7/06* (2006.01)
*G06N 3/04* (2023.01)
(Continued)

(52) U.S. Cl.
CPC ............. *H04L 5/0048* (2013.01); *G06N 3/04* (2013.01); *G06N 3/08* (2013.01); *H04B 7/061* (2013.01)

(58) Field of Classification Search
CPC .. H04B 7/0417; H04B 7/0621; H04B 7/0626; H04B 7/063; H04B 7/0632; H04B 7/065;
(Continued)

(56) References Cited

U.S. PATENT DOCUMENTS 10,547,366 B2    1/2020  Si et al.
2018/0076870 A1  3/2018  Kim et al.
(Continued)

FOREIGN PATENT DOCUMENTS

| CN | 107689821 A | 2/2018 |
| KR | 10-2067114 B1 | 1/2020 |
| WO | 2017/039394 A1 | 3/2017 |

OTHER PUBLICATIONS

Chao Lu, MIMO Channel Information Feedback Using Deep Recurrent Network, Jan. 2019, IEEE Communications Letters (Year: 2019).*

(Continued)

*Primary Examiner* — Harun Chowdhury
(74) *Attorney, Agent, or Firm* — Jefferson IP Law, LLP

(57) ABSTRACT

Methods and systems for reporting CSI and selecting optimal beams using ML. The CSI report is sent to a gNB, which includes feedback parameters, computed and predicted using ML. The feedback parameters are computed using measurements performed using CSI-RS. Values of the feedback parameters likely at future, based on channel variation
(Continued)

and the measurements, are pre-dicted using ML. The computed and predicted feedback parameters are included in the CSI report. Optimal CSI-RS resource allocation and optimal CSI reporting periodicity are determined using ML and sent to the gNB. The CSI report is encoded using the ML based model. The RSRP of the beams are predicted using ML for beam selection.

20 Claims, 21 Drawing Sheets

(51) Int. Cl.
  *G06N 3/08* (2023.01)
  *H04L 5/00* (2006.01)
(58) Field of Classification Search
  CPC .. H04W 24/10; H04W 72/0446; H04W 72/23
  USPC .......................................... 370/252, 312, 329
  See application file for complete search history.

(56) References Cited

U.S. PATENT DOCUMENTS

| | | | |
|---|---|---|---|
| 2018/0262250 A1 | 9/2018 | Kim et al. | |
| 2019/0097712 A1 | 3/2019 | Singh et al. | |
| 2019/0132099 A1* | 5/2019 | Wu | H04B 7/0621 |
| 2019/0140726 A1* | 5/2019 | Cirkic | H04B 7/0626 |
| 2019/0157770 A1* | 5/2019 | Park | H04W 72/0446 |
| 2019/0223036 A1* | 7/2019 | Lunttila | H04W 72/23 |
| 2019/0342768 A1 | 11/2019 | Xu et al. | |
| 2019/0379468 A1 | 12/2019 | Roessel et al. | |
| 2020/0052757 A1 | 2/2020 | Wang et al. | |
| 2020/0259545 A1* | 8/2020 | Bai | H04B 7/0626 |
| 2021/0226674 A1* | 7/2021 | Ramireddy | H04B 7/0417 |

OTHER PUBLICATIONS

3GPP TSG-RAN WG1 Meeting #95. Ericsson. Summary of views on CSI reporting v1. R1-1813854. Spokane, USA, Nov. 12-16, 2018.
3GPP TSG RAN WG1 Meeting #96-Bis. Fraunhofer IIS, Fraunhofer HHI. Further Enhancements on Type-II CSI Reporting: Doppler-domain Approach. R1-1904219. Xi'an, China Apr. 8-12, 2019.
Hanzaz, Zakaria, and Hans Dieter Schotten. "Analysis of effective SINR mapping models for MIMO OFDM in LTE system." 2013 9th international wireless communications and mobile computing conference (IWCMC). IEEE, 2013.
Schwarz, Stefan, Christian Mehlfuhrer, and Markus Rupp. "Calculation of the spatial preprocessing and link adaption feedback for 3GPP UMTS/LTE." 2010 Wireless Advanced 2010. IEEE, 2010.
Finol, David, et al. "Deep convolutional neural networks for eigenvalue problems in mechanics." Jul. 19, 2018.
Rico-Alvarino, Alberto, and Robert W. Heath. "Link adaptation in MIMO-OFDM with practical impairments." 2013 Asilomar Conference on Signals, Systems and Computers. IEEE, 2013.
Wang, Yuyang, Murali Narasimha, and Robert W. Heath. "MmWave beam prediction with situational awareness: A machine learning approach." 2018 IEEE 19th International Workshop on Signal Processing Advances in Wireless Communications (SPAWC). IEEE, May 23, 2018.
3GPP TS 38.214. 3rd Generation Partnership Project; Technical Specification Group Radio Access Network; NR; Physical layer procedures for data (Release 15).
3GPP TS 38.331. 3rd Generation Partnership Project; Technical Specification Group Radio Access Network; NR; Radio Resource Control (RRC) protocol specification (Release 15).

* cited by examiner

[Fig. 1]
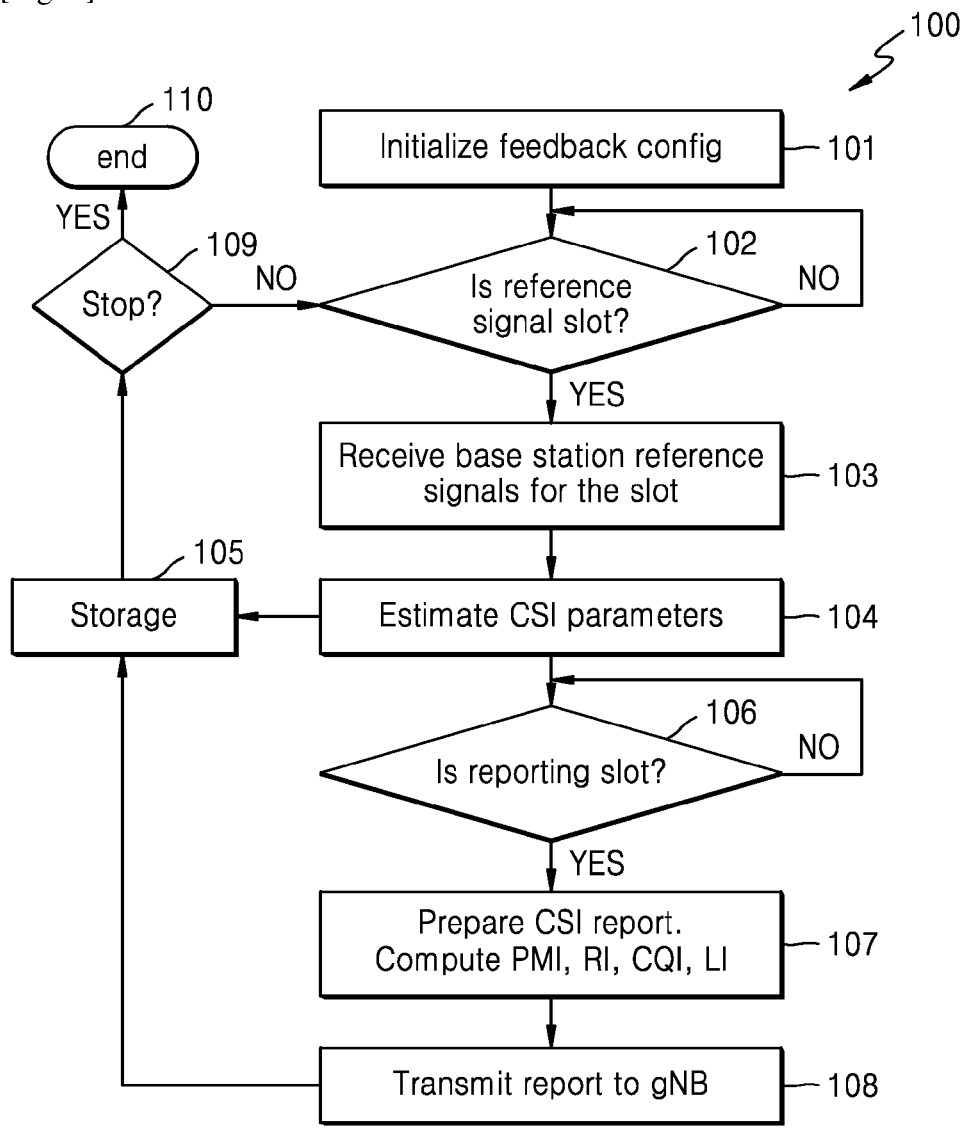

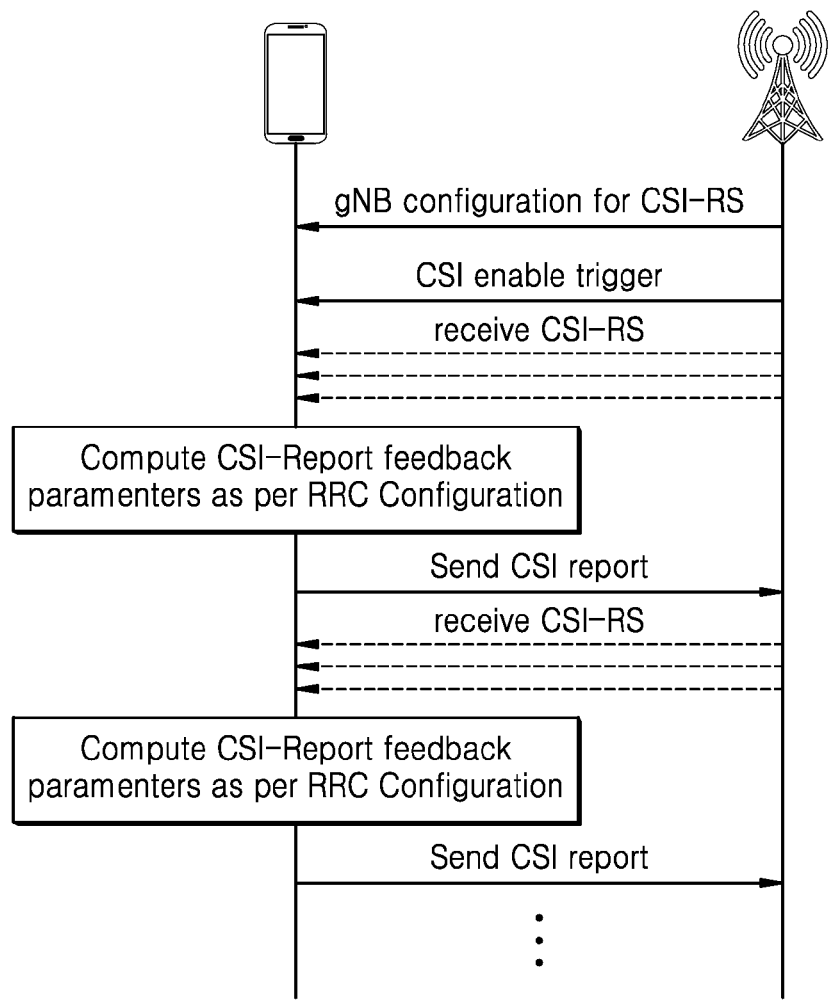
[Fig. 2]

[Fig. 3]
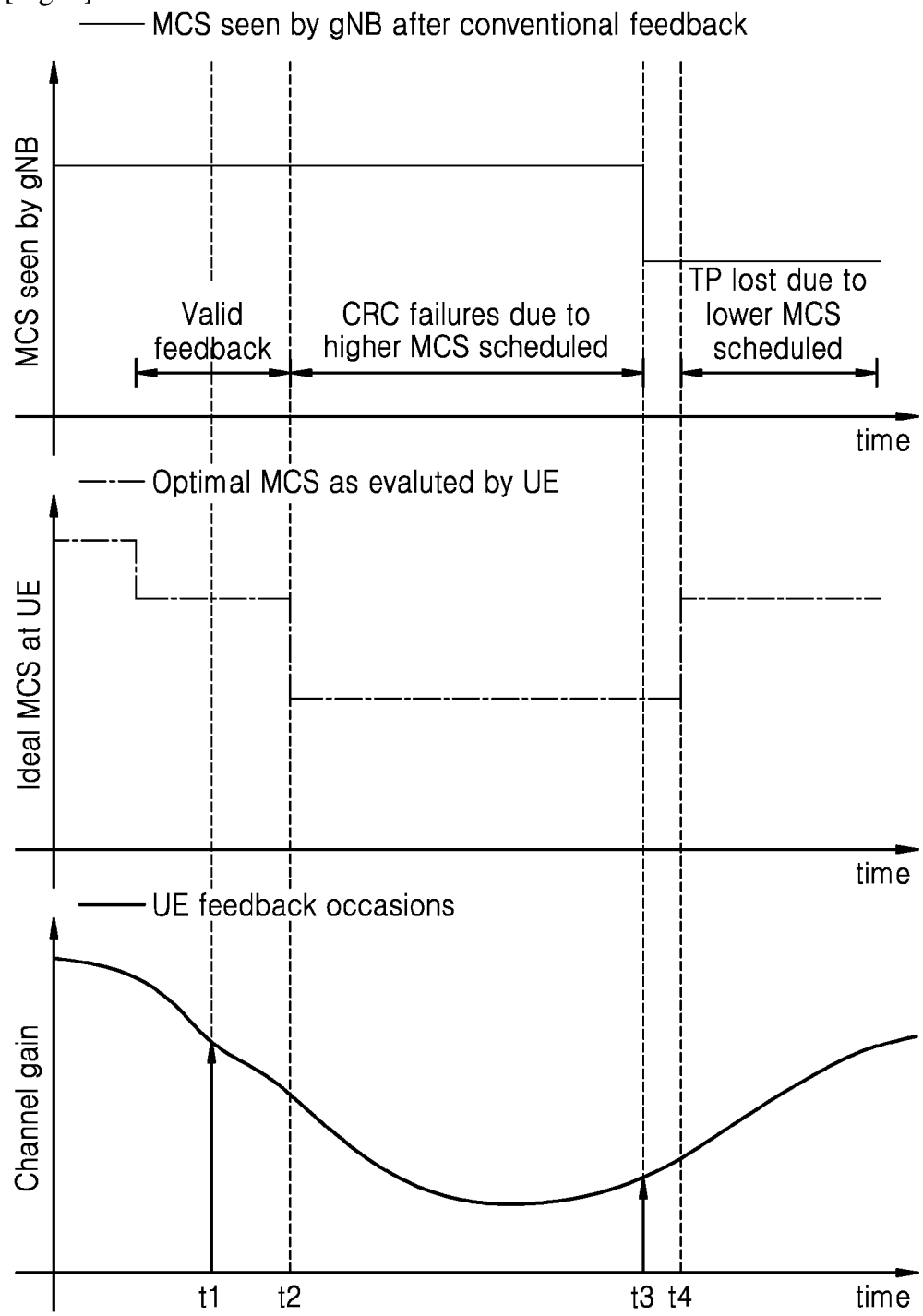

[Fig. 4]
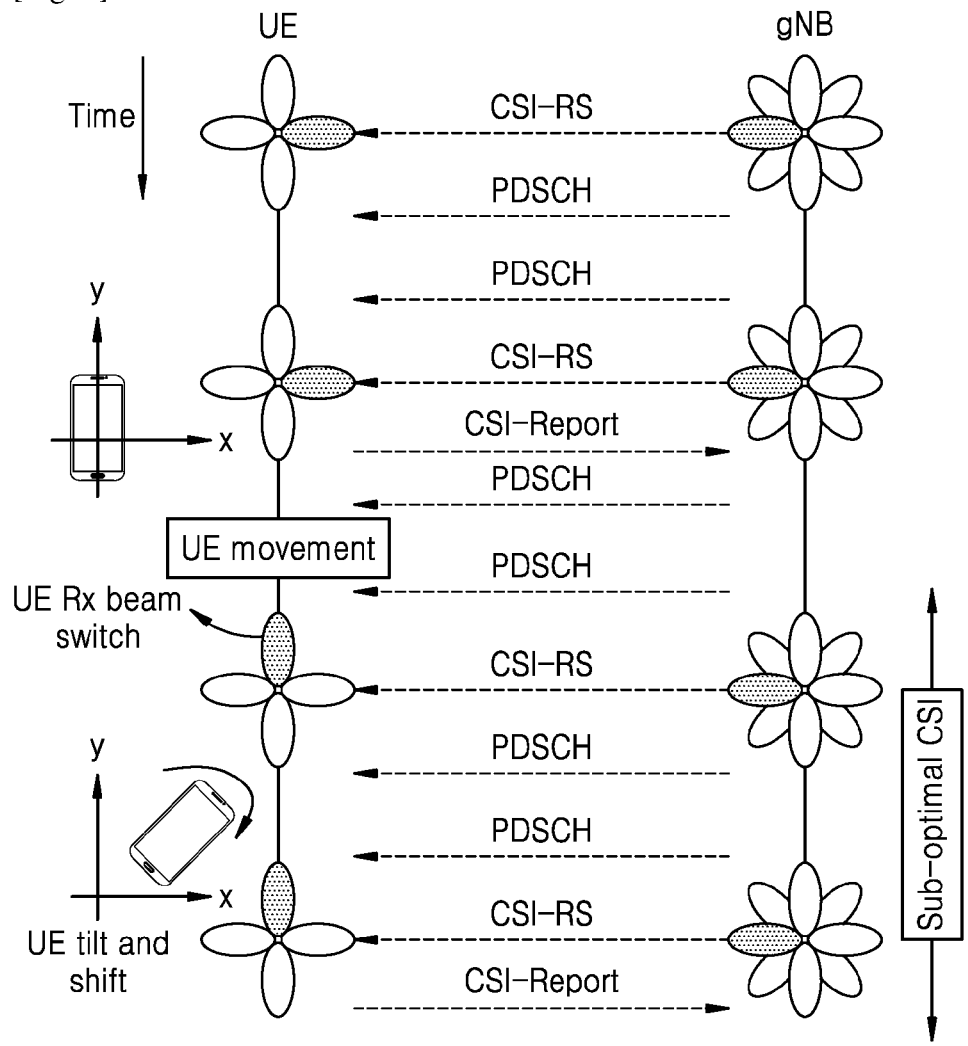
[Fig. 5]
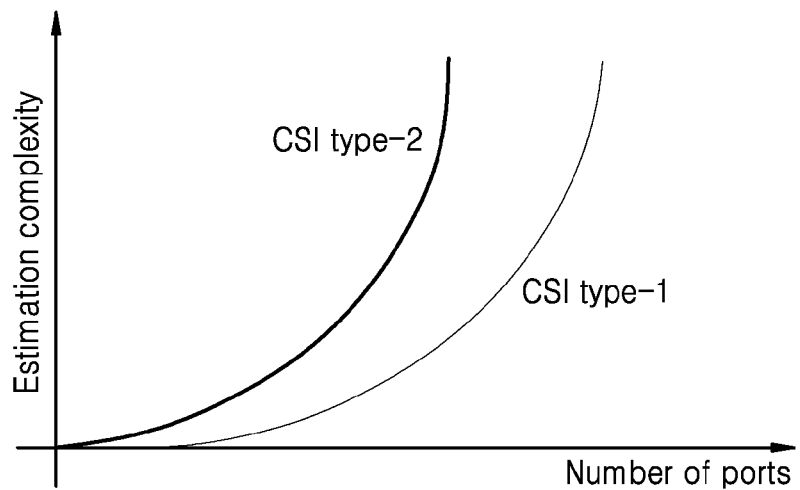

[Fig. 6A]
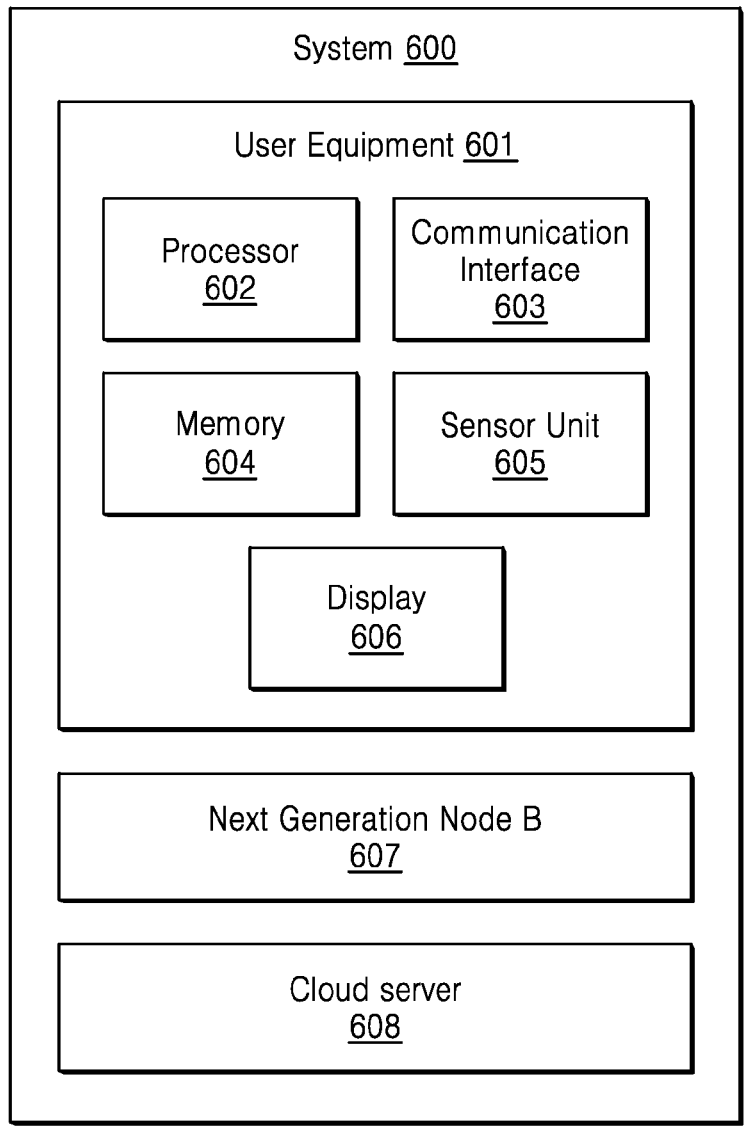
[Fig. 6B]
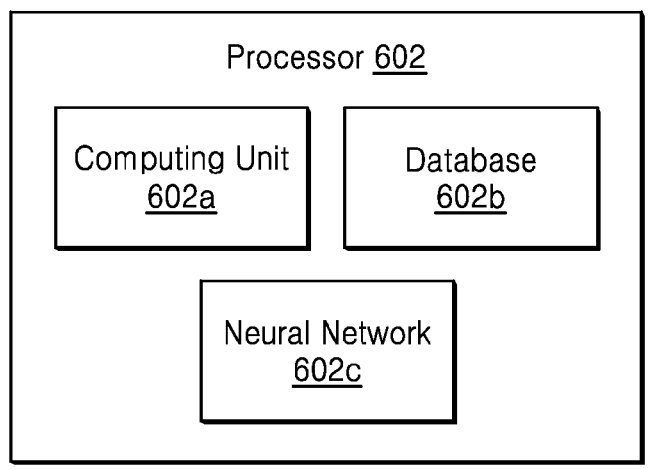

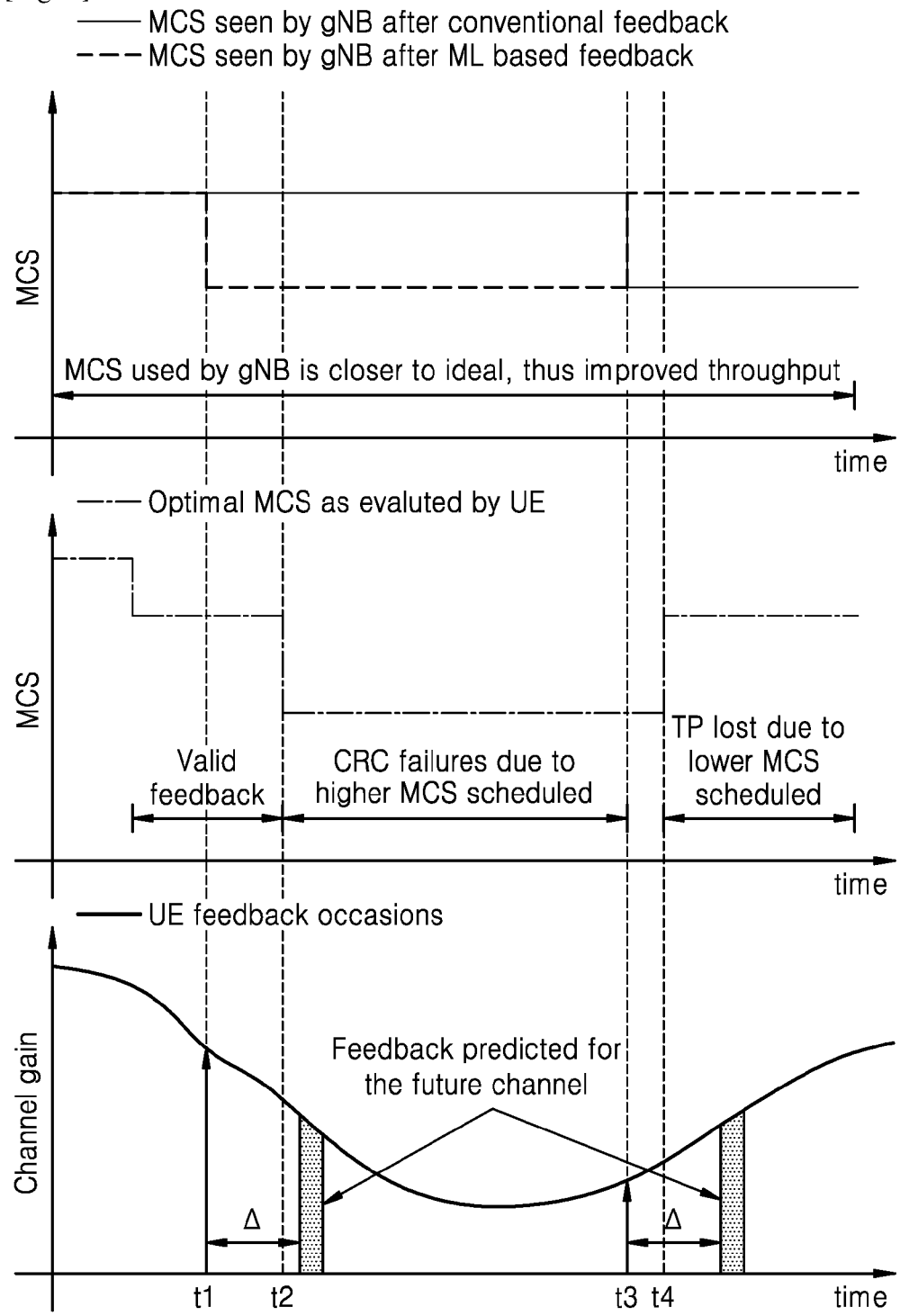
[Fig. 7]

[Fig. 8]
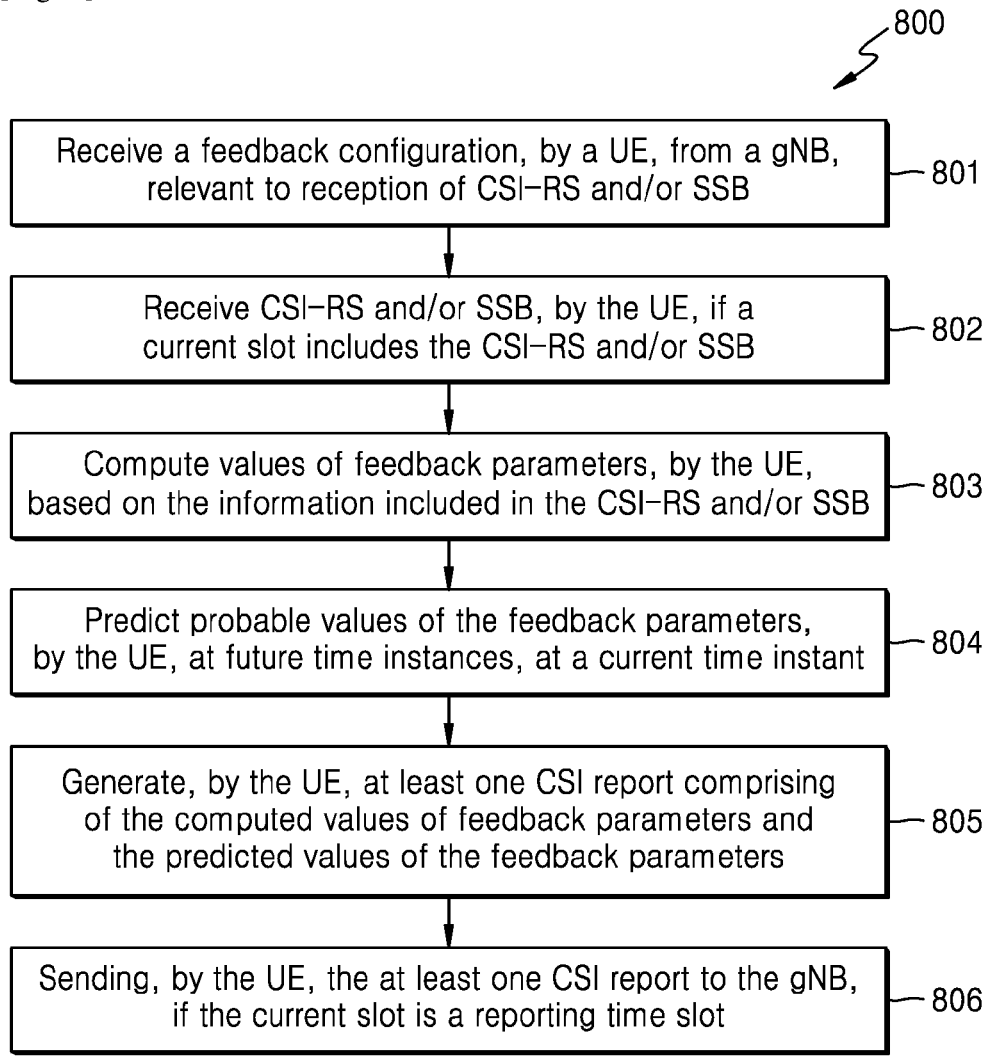
[Fig. 9A]
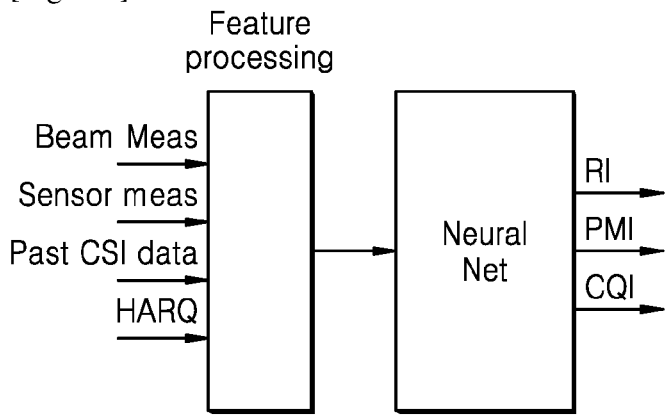

[Fig. 10]
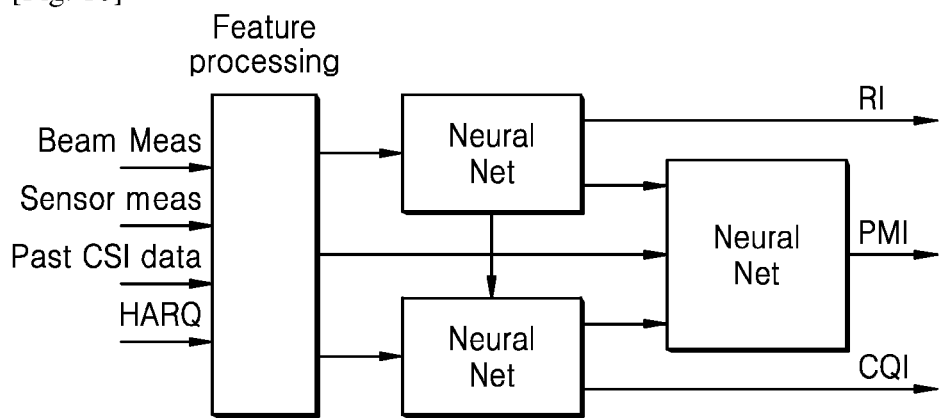

[Fig. 13A]
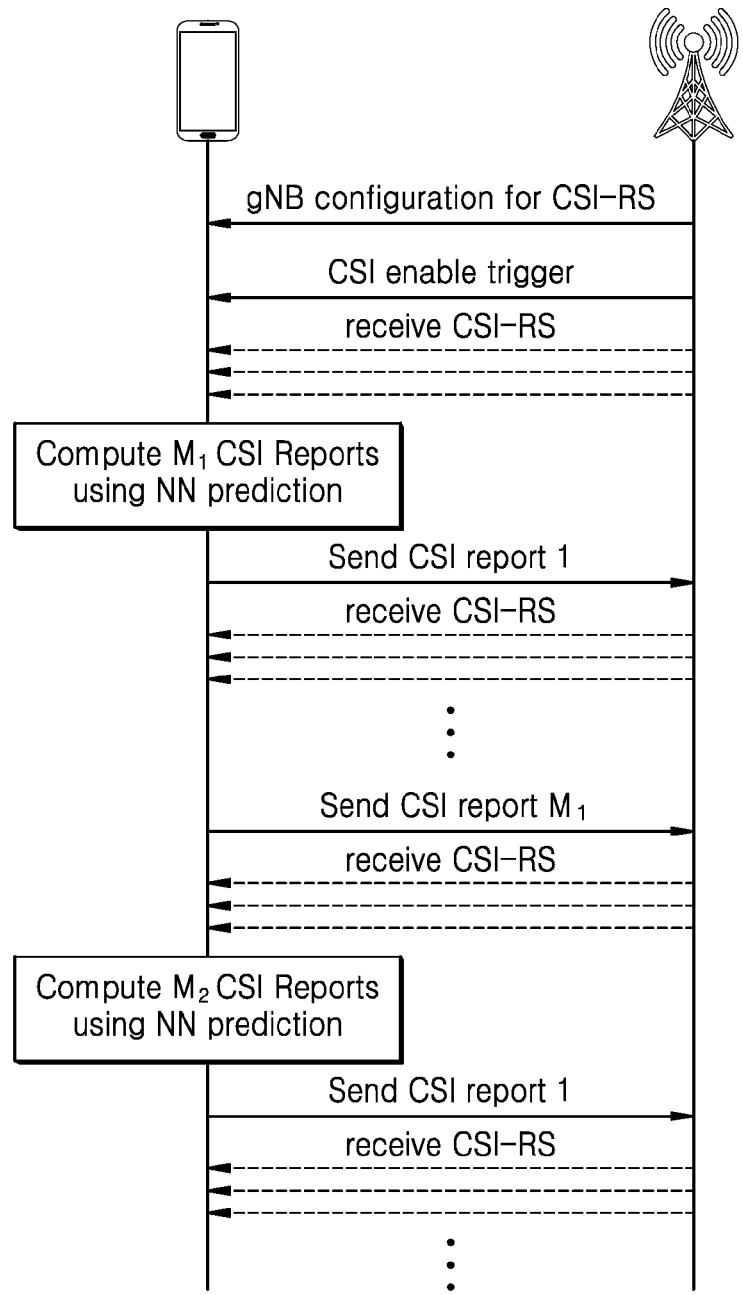

[Fig. 13B]
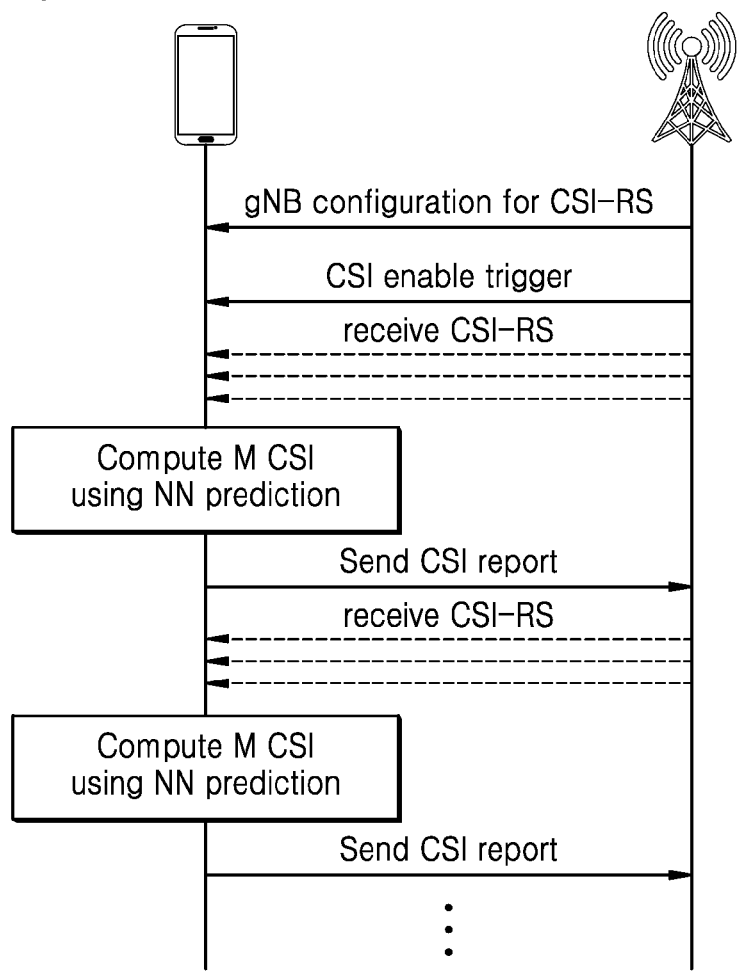

[Fig. 14]
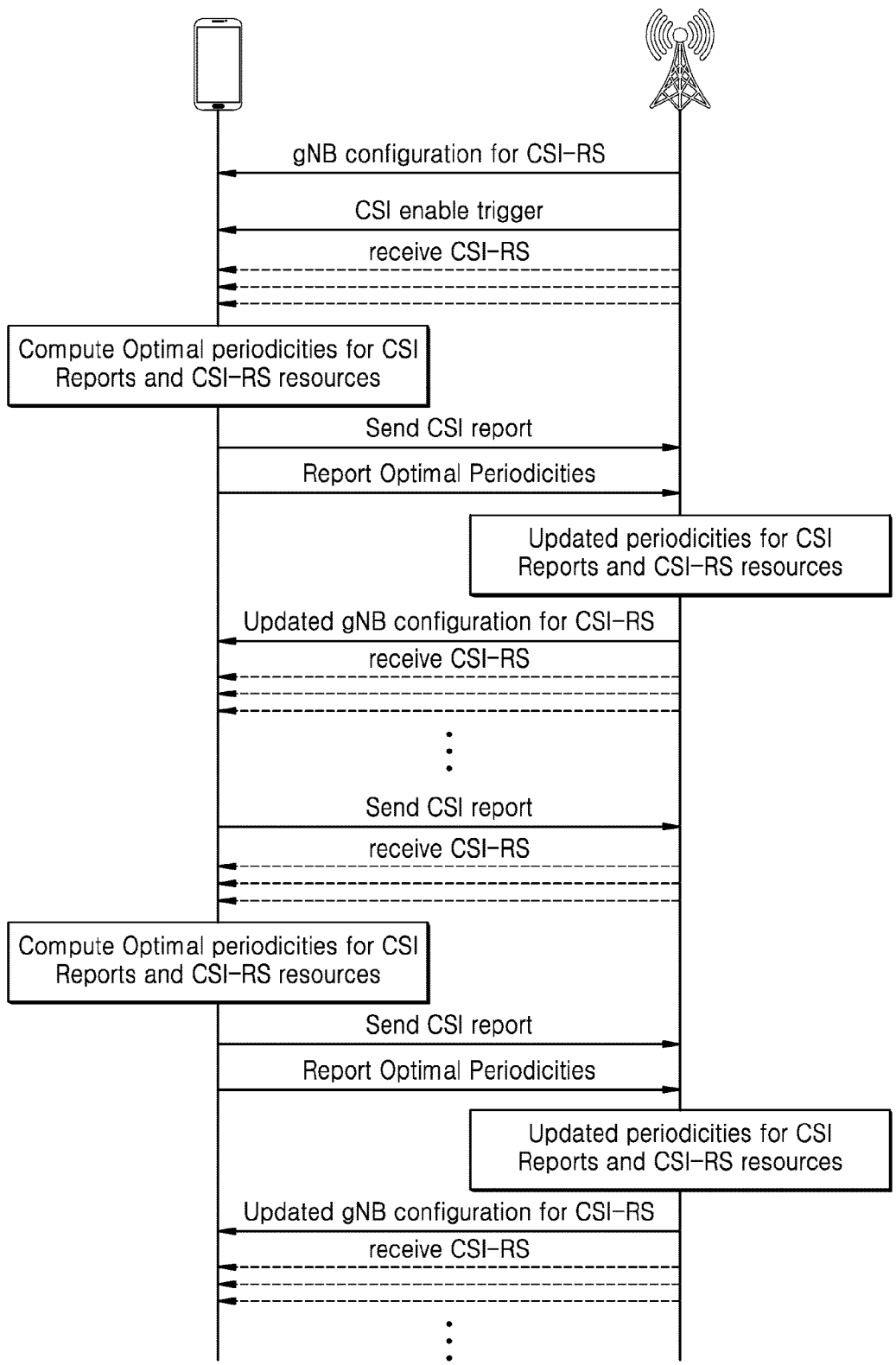

[Fig. 15A]
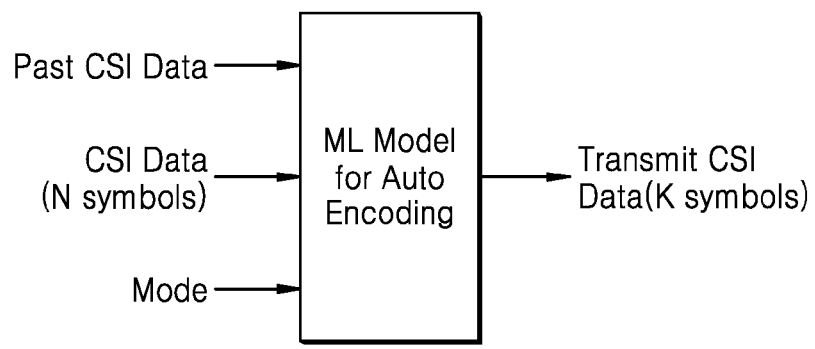
[Fig. 15B]
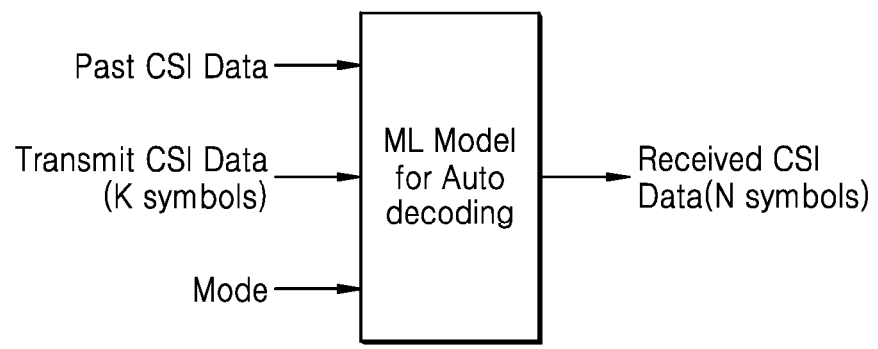

[Fig. 17]
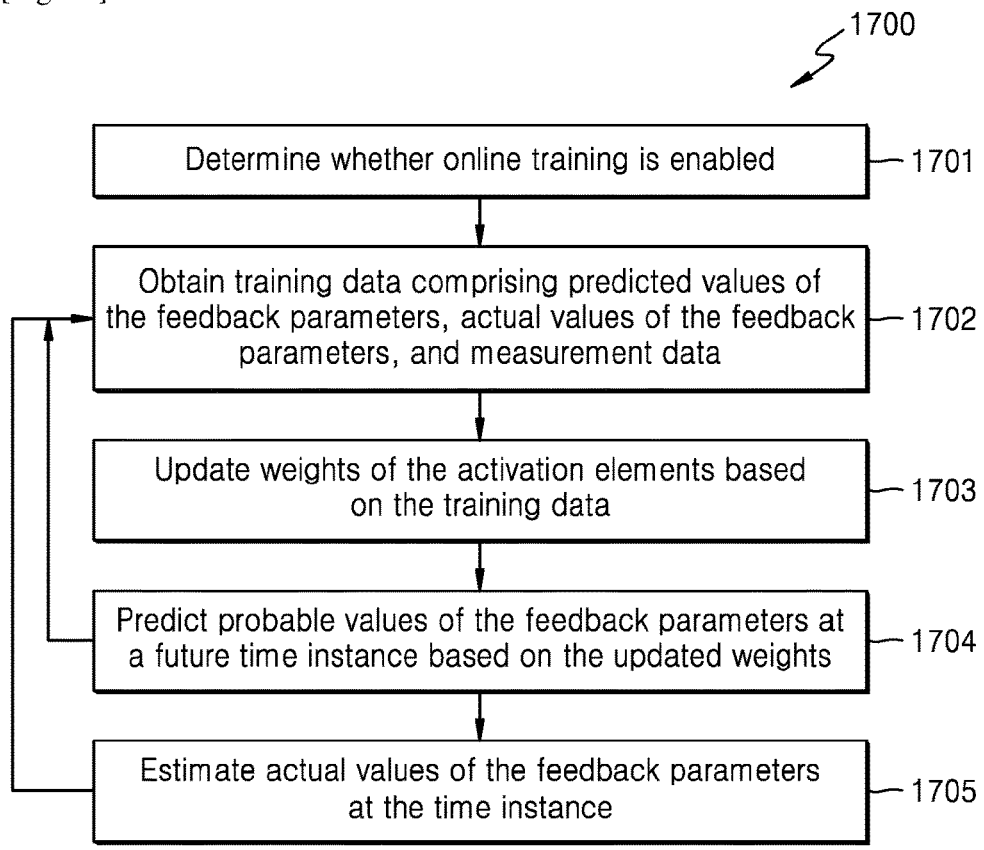
[Fig. 18]
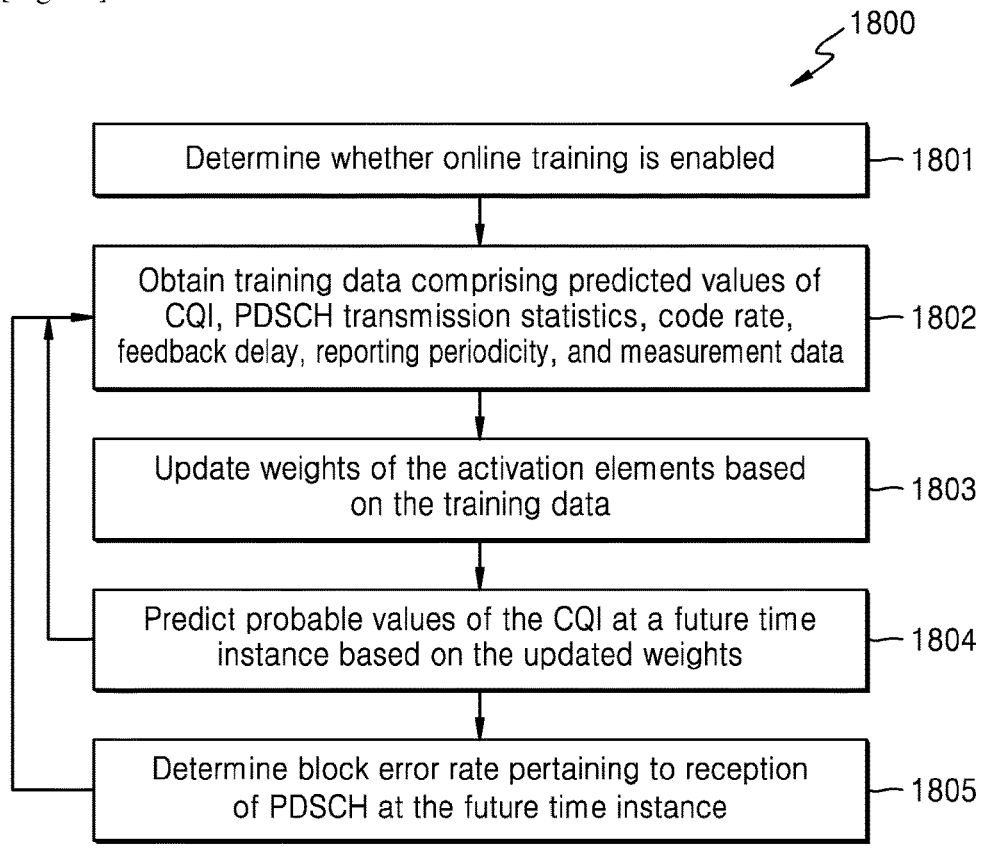

[Fig. 19]
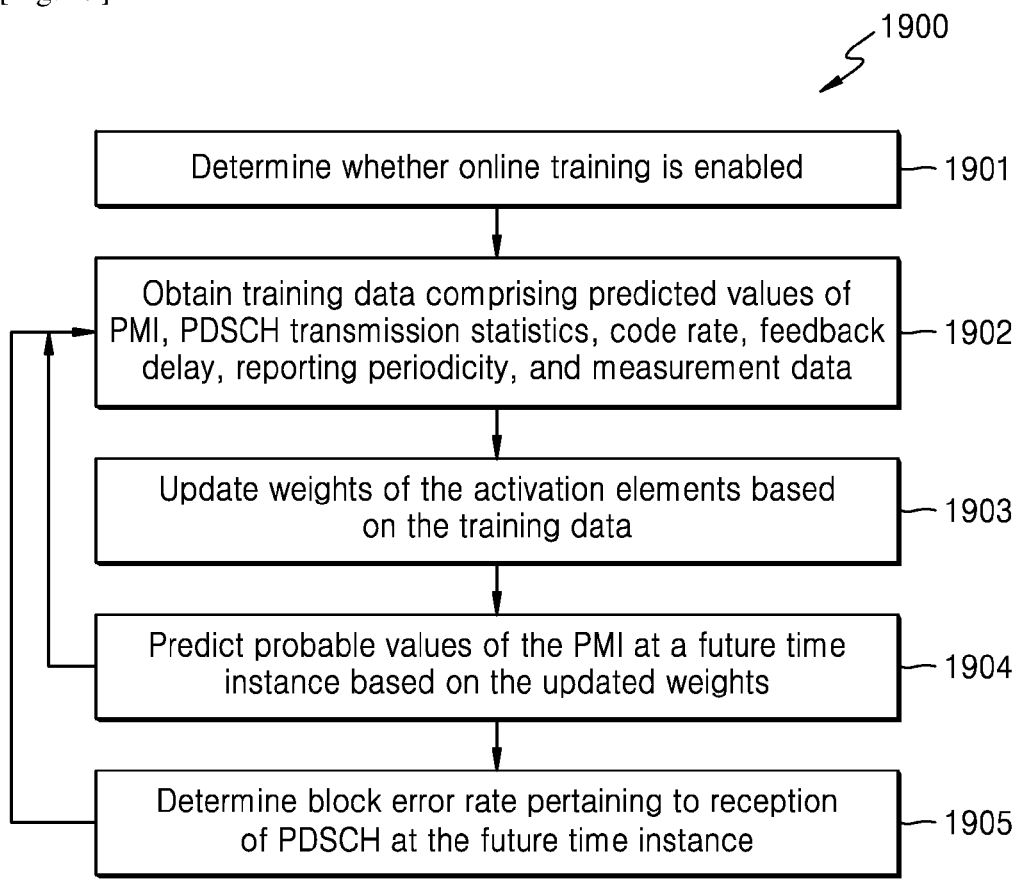

[Fig. 20]
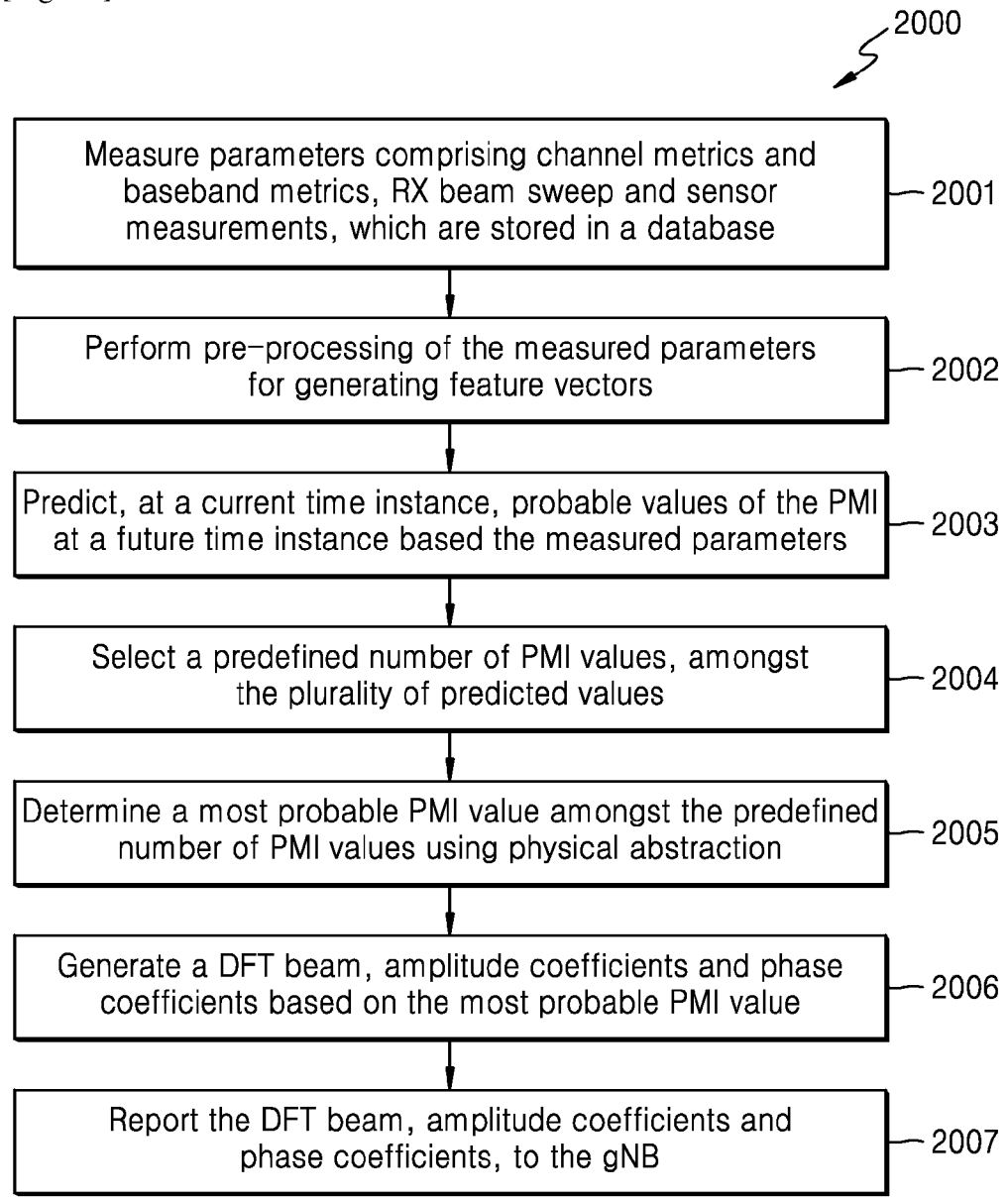

[Fig. 21]
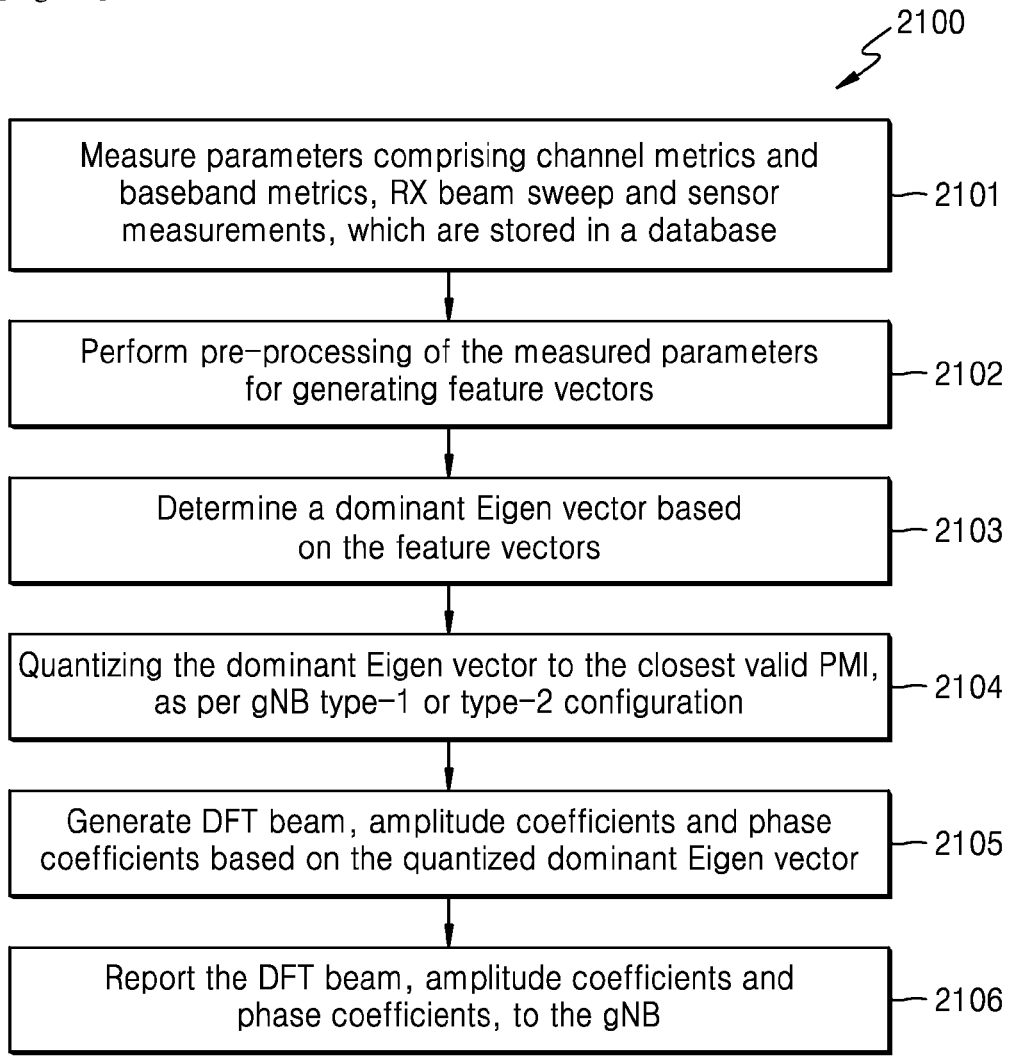
[Fig. 22]
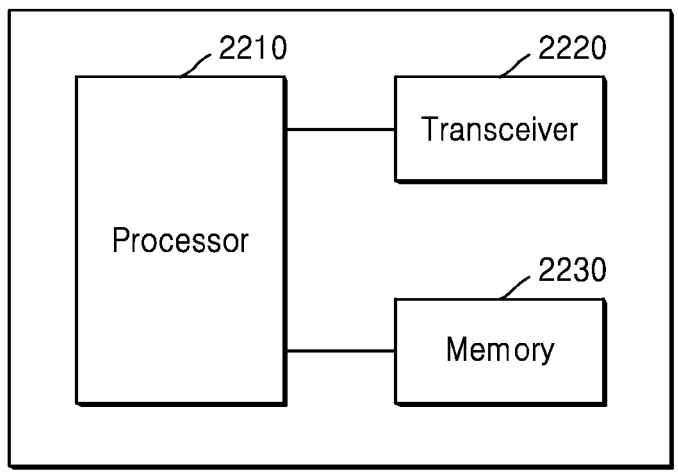

[Fig. 23]
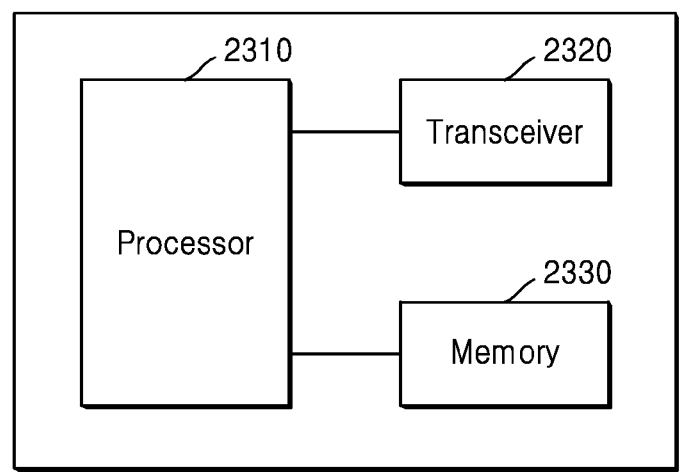

METHOD AND APPARATUS FOR REPORTING CHANNEL STATE INFORMATION

TECHNICAL FIELD

Embodiments herein relate to Channel State Information (CSI) reporting in $5^{th}$ Generation (5G) New Radio (NR) communication systems, and more particularly to methods and systems for generating a CSI report comprising of parameters estimated and predicted using Machine Learning.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), nonorthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

A method for generating Channel State Information (CSI) reports, the method comprising: determining, by a User Equipment, a plurality of radio parameters for a connection between the UE and a Next Generation node B (gNB); computing, by a neural network in the UE, values of CSI feedback parameters at a current time instance based on the determined plurality of radio parameters; predicting, by the neural network, probable values of the CSI feedback parameters at a future time instance; generating, by the neural network, a CSI report, by compiling at least one of the computed values of the CSI feedback parameters and the predicted values the CSI feedback parameters; and transmitting, by the UE, the CSI report to the gNB.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which:

FIG. 1 is a flowchart depicting an method for configuring a User Equipment (UE) to report Channel State Information CSI to a Next Generation Node B (gNB) according to embodiments of the present disclosure;

FIG. 2 is a sequence diagram depicting a flow of information involved in sending CSI reports to the gNB according to embodiments of the present disclosure;

FIG. 3 is a timing diagram depicting occurrences of bit error and throughput loss due to the sub-optimality of a received CSI report according to embodiments of the present disclosure;

FIG. 4 depicts an example scenario, wherein a CSI report received from a UE becomes sub-optimal due to a change in the orientation of the UE according to embodiments of the present disclosure;

FIG. 5 is a graph depicting a variation in computational complexity of CSI estimation with respect to variation in CSI type and number of ports of the UE according to embodiments of the present disclosure;

FIGS. 6A and 6B depict various units of a system, configured to generate a CSI report, comprising of parameters, which can be computed and predicted using neural network based learning model, according to embodiments as disclosed herein;

FIG. 7 depicts an example timing diagram, wherein there is a similarity between Modulation and Coding Scheme (MCS) chosen by the gNB and an optimal MCS evaluated by the UE, according to embodiments as disclosed herein;

FIG. 8 is a flowchart depicting a method for generating a CSI report, comprising of parameters, which can be computed and predicted using a neural network based learning model, according to embodiments as disclosed herein;

FIG. 9A depicts an example joint neural network model for jointly estimating and predicting a plurality of feedback parameters, according to embodiments as disclosed herein;

FIG. 10 depicts an example hierarchical neural network model for individually computing and predicting feedback parameters, according to embodiments as disclosed herein;

FIGS. 13A and 13B are example sequence diagrams depicting the generation of a plurality of CSI reports at the same time instance, according to embodiments as disclosed herein;

FIG. 14 is an example sequence diagram depicting the computation of optimal CSI-Reference Signals (CSI-RS) resource allocation and optimal periodicity of sending CSI reports to the gNB, according to embodiments as disclosed herein;

FIGS. 15A and 15B depict encoding and decoding of CSI reports for reducing overhead, according to embodiments as disclosed herein;

FIG. 17 is a flowchart depicting a method for training the neural network, according to embodiments as disclosed herein;

FIG. 18 is a flowchart depicting a method for training the neural network for predicting Channel Quality Indicator (CQI), according to embodiments as disclosed herein;

FIG. 19 is a flowchart depicting a method for training the neural network for predicting Precoding Matrix Indicator (PMI), according to embodiments as disclosed herein;

FIG. 20 is a flowchart depicting a method for predicting PMI using physical abstraction, for type-1 and type-2 CSI reporting, according to embodiments as disclosed herein;

FIG. 21 is a flowchart depicting a method for predicting PMI using Eigen vectors, for type-1 and type-2 CSI reporting, according to embodiments as disclosed herein;

FIG. 22 schematically illustrates the base station according to embodiments of the present disclosure; and FIG. 23 illustrates a user equipment (UE) according to embodiments of the present disclosure.

BEST MODE FOR CARRYING OUT THE INVENTION

Figure 9B:
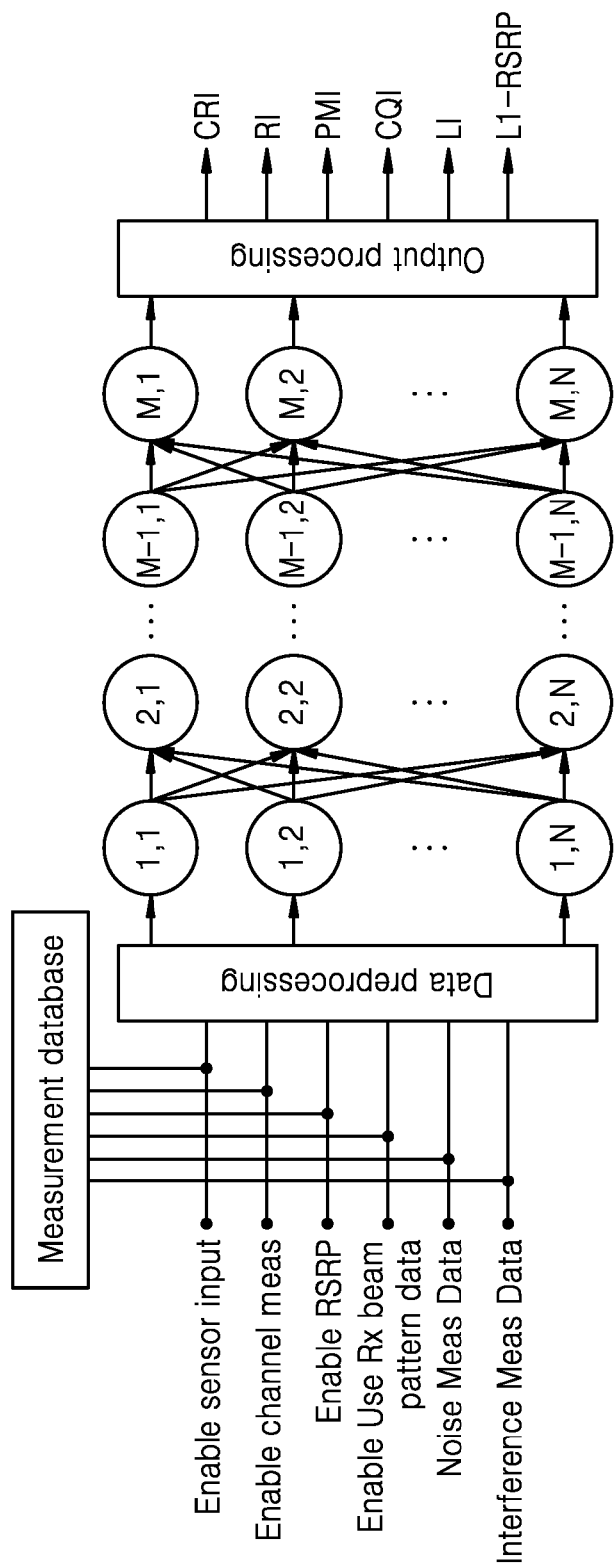
FIG. 9B depicts an architecture of the joint neural network model, according to embodiments as disclosed herein.

In an exemplary embodiment, a method for generating Channel State Information (CSI) reports, the method comprising: determining, by a User Equipment (UE) (601), a plurality of radio parameters for a connection between the UE (601) and a Next Generation node B (gNB) (607); computing, by a neural network (602*c*) in the UE (601), values of CSI feedback parameters at a current time instance based on the determined plurality of radio parameters; predicting, by the neural network (602*c*), probable values of the CSI feedback parameters at a future time instance; generating, by the neural network (602*c*), a CSI report, by compiling at least one of the computed values of the CSI feedback parameters and the predicted values the CSI feedback parameters; and transmitting, by the UE (601), the CSI report to the gNB (607).

In an exemplary embodiment, the plurality of radio parameters comprises at least one of at least one CSI-Reference Signal (CSI-RS) and at least one Synchronization Signal Block (SSB).

In an exemplary embodiment, wherein the values of the CSI feedback parameters are computed based on at least one of channel metrics, Receiver (RX) beam pattern information, sensor parameters, and baseband metrics, derived from at least one of the CSI-RS and SSB; wherein reliability of the connection between the UE (601) and the gNB (607) is based on values of the baseband metrics; wherein the sensor parameters are obtained through measurements performed by a sensor unit (605) of the UE (601).

In an exemplary embodiment, wherein the probable values of the CSI feedback parameters at the future time instance are predicted based on at least one of: a pattern of variation in at least one of the channel metrics, RX beam pattern information, and baseband metrics, with respect to variation in the sensor parameters; a delay in scheduling a Physical Downlink Scheduling Channel (PDSCH) by the gNB (607) after receiving the CSI report from the UE (601); a block error rate pertaining to reception of the PDSCH; a CSI reporting periodicity; and a code rate for scheduling the PDSCH by the gNB (607).

In an exemplary embodiment, wherein the selection of the future time instance is based on a likelihood of variation in at least one of the channel metrics, RX beam pattern information, baseband metrics, sensor measurements, block error rate, and a difference between an optimal code rate estimated by UE (601) and a code rate selected by the gNB (607) for scheduling transmission of the PDSCH.

In an exemplary embodiment, wherein the neural network (602*c*) is trained to minimize a cost function, for fitting the generated CSI report between periodic CSI reporting slots, wherein the cost function is minimized if the predicted values of the feedback parameters at the future time instance match actual values of the feedback parameters at the future time instance, wherein the neural network (602*c*) is trained in one of the UE (601) and a cloud server (608).

In an exemplary embodiment, wherein matching the predicted values and the actual values comprises updating at least one weight associated with at least one activation element of at least one layer of the neural network (602*c*), wherein the at least one weight is updated based on at least one of channel metrics, RX beam pattern information, baseband metrics, sensor measurements, a difference between the predicted values and the actual values, and PDSCH transmission error statistics.

In an exemplary embodiment, wherein the method further comprises generating, by the neural network (602*c*), a plurality of CSI reports by at least one of computing and predicting probable values of the feedback parameters at a plurality of future time instances, wherein the plurality of CSI reports are sent to the gNB (607) in one of a single reporting slot and a plurality of periodic reporting slots.

In an exemplary embodiment, wherein the UE (601) generates the plurality of CSI reports if the UE (601) predicts with a degree of confidence, greater than a predefined threshold, at least one of a probable condition of a channel between the UE (601) and the gNB (607), and a probable Doppler spread, during each of the plurality of periodic reporting slots.

In an exemplary embodiment, wherein generating the CSI report comprises encoding, by the neural network (602c), the compiled at least one of the computed values of the CSI feedback parameters and the predicted values the CSI feedback parameters.

In an exemplary embodiment, wherein the encoding of the generated CSI report is based on a correlation between data of a previous CSI report and data of the generated CSI report.

In an exemplary embodiment, wherein the method for computing, by the neural network (602c), the CSI feedback parameters includes computing Reference Signal Received Power (RSRP) associated with a plurality of beams of the UE (601) at the current time instance, for determining an optimal beam at the current time instance and predicting optimal beams at the future time instances.

In an exemplary embodiment, wherein the computation of the RSRPs associated with the beams of the UE (601) is based on at least one of: a previous beam measurement data, obtained at previous time instances, and a current beam measurement data obtained at the current time instance, wherein the beam measurement data comprises at least one of a beam orientation, beam selection based on RSRP associated with the beams of the UE (601) and position of the UE (601), and a previous RX beam pattern information; a beam gain pattern; and a relevance of the previous beam measurement data at the current time instance, wherein the relevance of the previous beam measurement data is based on a degree of correlation between the previous beam measurement data and the current beam measurement data.

In an exemplary embodiment, wherein the method further comprises: determining, by the neural network (602c), an optimal CSI-RS resource allocation and an optimal periodicity for sending CSI reports to the gNB (607), based on variation in a condition of a channel between the UE (601) and the gNB (607); and sending, by the UE (601), to the gNB (607), the optimal CSI-RS resource allocation and the optimal periodicity for sending CSI reports to the gNB (607).

In an exemplary embodiment, wherein the neural network (602c) model is one of: a hierarchical model, a cascaded model, a joint neural network model, and a Deep Neural Network (DNN) model comprising of Fully Connected layers and convolutional layers.

In an exemplary embodiment, wherein the DNN model comprises of a neural network channel predictor and a neural network classifier, wherein the neural network channel predictor and the neural network classifier comprises of Fully Connected layers and convolutional layers, wherein the neural network channel predictor is trained to predict channel metrics, RX beam pattern information, sensor parameters, and baseband metrics, based on previously derived channel metrics, RX beam pattern information, sensor parameters, and baseband metrics; wherein the neural network classifier is trained to predict, at a time instance, the probable values of the feedback parameters at a future time instance.

In an exemplary embodiment, wherein one of the CSI feedback parameters is a Precoding Matrix Indicator (PMI), wherein the neural network (602c) determines a most probable PMI value amongst a predefined number of probable PMI values, wherein the predefined number of PMI values are selected amongst a plurality of predicted PMI values. In an exemplary embodiment, wherein the most probable PMI value is determined based on an average value of mutual information, wherein the average value of mutual information corresponding to the most probable PMI value is highest among the average values of mutual information corresponding to the predefined number of probable PMI values.

In an exemplary embodiment, wherein one of the CSI feedback parameters is a PMI, wherein the prediction of a probable value of PMI comprises: determining a dominant Eigen vector amongst a plurality of Eigen vectors, wherein the dominant Eigen vector is determined based on a plurality of feature vectors generated based on content derived from at least one of at least one CSI-R) and at least one SSB; quantizing the dominant Eigen vector to a nearest valid PMI value, wherein the gNB (607) provides a plurality of valid PMI values to the UE (601); and generating at least one of a Discrete Fourier Transform (DFT) beam, amplitude coefficients and phase coefficients, based on the quantized dominant Eigen vector, wherein the predicted value of PMI comprises at least one of the DFT beam, amplitude coefficients and phase coefficients.

In an exemplary embodiment, wherein the probable values of the CSI feedback parameters at the future time instance is determined based on the plurality of radio resources received at a plurality of time instances.

In an exemplary embodiment, wherein the plurality of radio parameters are one of measured by the UE (601) and received from the gNB (607).

In an exemplary embodiment, a system (600) for generating Channel State Information (CSI) reports, the system (600) comprising: a User Equipment (UE) (601); a Next Generation node B (gNB) (607); and a cloud server (608);

wherein the UE (601) is configured to: determine, a plurality of radio parameters for a connection between the UE (601) and the gNB (607); compute, by a neural network (602c) in the UE (601), values of CSI feedback parameters at a current time instance based on the determined plurality of radio parameters; predict, by the neural network (602c), probable values of the CSI feedback parameters at a future time instance; generate, by the neural network (602c), a CSI report, by compiling at least one of the computed values of the CSI feedback parameters and the predicted values the CSI feedback parameters; and transmit the CSI report to the gNB (607).

In an exemplary embodiment, the plurality of radio parameters comprises at least one of at least one CSI-Reference Signal (CSI-RS) and at least one Synchronization Signal Block (SSB).

In an exemplary embodiment, wherein the values of the CSI feedback parameters are computed based on at least one of channel metrics, Receiver (RX) beam pattern information, sensor parameters, and baseband metrics, derived from at least one of the CSI-RS and SSB; wherein reliability of the connection between the UE (601) and the gNB (607) is based on values of the baseband metrics; wherein the sensor parameters are obtained through measurements performed by a sensor unit (605) of the UE (601).

In an exemplary embodiment, wherein the probable values of the CSI feedback parameters at the future time instance are predicted based on at least one of: a pattern of variation in at least one of the channel metrics, RX beam pattern information, and baseband metrics, with respect to variation in the sensor parameters; a delay in scheduling a Physical Downlink Scheduling Channel (PDSCH) by the gNB (607) after receiving the CSI report from the UE (601);

a block error rate pertaining to reception of the PDSCH; a CSI reporting periodicity; and a code rate for scheduling the PDSCH by the gNB (607).

In an exemplary embodiment, wherein the selection of the future time instance is based on a likelihood of variation in at least one of the channel metrics, RX beam pattern information, baseband metrics, sensor measurements, block error rate, and a difference between an optimal code rate estimated by UE (601) and a code rate selected by the gNB (607) for scheduling transmission of the PDSCH.

In an exemplary embodiment, wherein the neural network (602c) is trained to minimize a cost function, for fitting the generated CSI report between periodic CSI reporting slots, wherein the cost function is minimized if the predicted values of the feedback parameters at the future time instance match actual values of the feedback parameters at the future time instance, wherein the neural network (602c) is trained in one of the UE (601) and a cloud server (608).

In an exemplary embodiment, wherein matching the predicted values and the actual values comprises updating at least one weight associated with at least one activation element of at least one layer of the neural network (602c), wherein the at least one weight is updated based on at least one of channel metrics, RX beam pattern information, baseband metrics, sensor measurements, a difference between the predicted values and the actual values, and PDSCH transmission error statistics.

In an exemplary embodiment, wherein the system (600) is further configured to generate, by the neural network (602c), a plurality of CSI reports by at least one of computing and predicting probable values of the feedback parameters at a plurality of future time instances, wherein the plurality of CSI reports are sent to the gNB (607) in one of a single reporting slot and a plurality of periodic reporting slots.

In an exemplary embodiment, wherein the UE (601) generates the plurality of CSI reports if the UE (601) predicts with a degree of confidence, greater than a predefined threshold, at least one of a probable condition of a channel between the UE (601) and the gNB (607), and a probable Doppler spread, during each of the plurality of periodic reporting slots.

In an exemplary embodiment, wherein generating the CSI report comprises encoding, by the neural network (602c), the compiled at least one of the computed values of the CSI feedback parameters and the predicted values the CSI feedback parameters.

In an exemplary embodiment, wherein the encoding of the generated CSI report is based on a correlation between data of a previous CSI report and data of the generated CSI report.

In an exemplary embodiment, wherein computing, by the neural network (602c), the CSI feedback parameters includes computing Reference Signal Received Power (RSRP) associated with a plurality of beams of the UE (601) at the current time instance, for determining an optimal beam at the current time instance and predicting optimal beams at the future time instances.

In an exemplary embodiment, wherein the computation of the RSRPs associated with the beams of the UE (601) is based on at least one of: a previous beam measurement data, obtained at previous time instances, and a current beam measurement data obtained at the current time instance, wherein the beam measurement data comprises at least one of a beam orientation, beam selection based on RSRP associated with the beams of the UE (601) and position of the UE (601), and a previous RX beam pattern information; a beam gain pattern; and a relevance of the previous beam measurement data at the current time instance, wherein the relevance of the previous beam measurement data is based on a degree of correlation between the previous beam measurement data and the current beam measurement data.

In an exemplary embodiment, wherein the method further comprises: determining, by the neural network (602c), an optimal CSI-RS resource allocation and an optimal periodicity for sending CSI reports to the gNB (607), based on variation in a condition of a channel between the UE (601) and the gNB (607); and sending, by the UE (601), to the gNB (607), the optimal CSI-RS resource allocation and the optimal periodicity for sending CSI reports to the gNB (607).

In an exemplary embodiment, wherein the neural network (602c) model is one of: a hierarchical model, a cascaded model, a joint neural network model, and a Deep Neural Network (DNN) model comprising of Fully Connected layers and convolutional layers.

In an exemplary embodiment, wherein the DNN model comprises of a neural network channel predictor and a neural network classifier, wherein the neural network channel predictor and the neural network classifier comprises of Fully Connected layers and convolutional layers, wherein the neural network channel predictor is trained to predict channel metrics, RX beam pattern information, sensor parameters, and baseband metrics, based on previously derived channel metrics, RX beam pattern information, sensor parameters, and baseband metrics; wherein the neural network classifier is trained to predict, at a time instance, the probable values of the feedback parameters at a future time instance.

In an exemplary embodiment, wherein one of the CSI feedback parameters is a Precoding Matrix Indicator (PMI), wherein the neural network (602c) determines a most probable PMI value amongst a predefined number of probable PMI values, wherein the predefined number of PMI values are selected amongst a plurality of predicted PMI values.

In an exemplary embodiment, wherein the most probable PMI value is determined based on an average value of mutual information, wherein the average value of mutual information corresponding to the most probable PMI value is highest among the average values of mutual information corresponding to the predefined number of probable PMI values.

In an exemplary embodiment, wherein one of the CSI feedback parameters is a PMI, wherein the prediction of a probable value of PMI comprises: determining a dominant Eigen vector amongst a plurality of Eigen vectors, wherein the dominant Eigen vector is determined based on a plurality of feature vectors generated based on content derived from at least one of at least one CSI-R) and at least one SSB; quantizing the dominant Eigen vector to a nearest valid PMI value, wherein the gNB (607) provides a plurality of valid PMI values to the UE (601); and generating at least one of a Discrete Fourier Transform (DFT) beam, amplitude coefficients and phase coefficients, based on the quantized dominant Eigen vector, wherein the predicted value of PMI comprises at least one of the DFT beam, amplitude coefficients and phase coefficients.

In an exemplary embodiment, wherein the probable values of the CSI feedback parameters at the future time instance is determined based on the plurality of radio resources received at a plurality of time instances.

In an exemplary embodiment, The system (600), as claimed in claim 1, wherein the plurality of radio parameters are one of measured by the UE (601) and received from the gNB (607).

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the scope of the embodiments thereof, and the embodiments herein include all such modifications.

MODE FOR THE INVENTION

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for reporting Channel State Information (CSI), to a Next Generation Node B (gNB), comprising of at least one parameter, wherein the at least one parameter is computed and/or predicted using at least one Machine Learning (ML) based learning model. The embodiments include computing at least one transmission parameter using the at least one ML based model. The parameter(s) can be considered as feedback parameters, when the parameters are included in the CSI report that is sent to the gNB. The embodiments include computing the feedback parameter(s) based on measurement data comprising channel metrics and baseband metrics, determined using CSI-Reference Signal (CSI-RS) and/or Synchronization Signal Block (SSB)); and a relationship between the measurement data and measurement data obtained from the sensors of the UE. The gNB can utilize the feedback parameters for scheduling transmission of Physical Downlink Scheduling Channel (PDSCH).

The embodiments include predicting the probable values of the feedback parameters at a future time instance, using the at least one ML based model. The embodiments include sending the predicted feedback parameters to the gNB through the CSI report. The embodiments include generating a plurality of CSI reports using the at least one ML based model, wherein each of the plurality of CSI reports include the predicted values of the feedback parameters at a future time instance. In an embodiment the plurality of CSI reports are sent at the same time or each of the plurality of CSI reports are sent periodically.

The embodiments include determining an optimal CSI-RS resource allocation and/or an optimal periodicity for reporting CSI, using the at least one ML based model. The embodiments include sending the determined optimal CSI-RS resource allocation and the optimal CSI reporting periodicity to the gNB. The embodiments include encoding the CSI report using the at least one ML based model, wherein the encoding can lead to compression of CSI report data. Encoding the CSI report data allows reducing the communication overhead. The embodiments include predicting Reference Signal Received Power (RSRP) of the each beams using the at least one ML based model, for beam selection; wherein the prediction of the RSRP is performed based on beam past measurements and orientation data measured by sensors.

The principal object of the embodiments herein is to disclose methods and systems for reporting Channel State Information (CSI) to a Next Generation Node B (gNB), by a User Equipment (UE), wherein the CSI report includes at least one parameter that is computed and predicted using at least one Machine Learning (ML) based learning model.

Another object of the embodiments herein is to compute at least one transmission metric using at least one ML based model; wherein the at least one computed transmission metric can be considered as feedback parameter(s), which are included in the CSI report to allow the gNB to schedule transmission of Physical Downlink Scheduling Channel (PDSCH).

Another object of the embodiments herein is to predict probable values of the feedback parameters at future time instances, using the at least one ML based model, and include the predicted feedback parameters in the CSI report; wherein the at least one ML based model may consider variations in factors such as delay in gNB scheduling PDSCH, channel conditions, block error rate, CSI reporting periodicity, code rate, and so on, for predicting the future values of the feedback parameters, in order to improve the accuracy of prediction and increase the optimality of the CSI report.

Another object of the embodiments herein is to generate a plurality of CSI reports using the at least one ML based model, wherein each of the plurality of CSI reports includes the predicted values of the feedback parameters at a plurality of future time instances, wherein either the plurality of CSI reports are sent to the gNB at the same time or each of the multiple CSI reports are sent periodically, based on a feedback configuration.

Another object of the embodiments herein is to determine optimal CSI-RS resource allocation and/or optimal CSI reporting periodicity using the at least one ML based model, and sending the optimal CSI-RS resource allocation and the optimal CSI reporting periodicity to the gNB.

Another object of the embodiments herein is to encode the CSI report data, using the at least one ML based model or non-learning model(s), to reduce communication overhead; wherein the encoding results in compression of the CSI report data.

Another object of the embodiments herein is to predict Reference Signal Received Power (RSRP) of the beams of the UE, at a time instance, for beam selection using the at least one ML based model, wherein the RSRP prediction can be performed based on beam measurement data obtained from sensors of the UE.

Accordingly, the embodiments provide methods and systems for reporting Channel State Information (CSI), to a Next Generation Node B (gNB), comprising of parameters, wherein the parameters are computed and/or predicted using Neural Network (NN) based learning models. For example, the parameters can be Precoding Matrix Indicator (PMI), Channel Quality Indicator (CQI), CSI-Reference Signals (CSI-RS) Indicator (CRI), Rank Indicator (RI), and so on. The parameters can be referred to as feedback parameters, when included in the CSI report. The embodiments include receiving a Radio Resource Configuration (RRC) message, which comprises of feedback configuration for CSI-Reference Signals (CSI-RS). The feedback configuration for CSI-RS, received from the gNB, may include information such as CSI reporting periodicity; port, time (slot or symbol) and frequency, information pertaining to reception of the CSI-RS, type of measurement, parameters to be included in the CSI report, feedback configuration type, and so on.

The embodiments include receiving CSI-RS from the gNB. The embodiments include estimating channel (between the UE and the gNB) metrics, such as channel gain at different frequencies, channel coefficients, channel noise, and so on, based on the CSI-RS. The UE may also choose to use Synchronization Signal Blocks (SSBs) for improving the estimation of the channel metrics. The embodiments include measuring baseband parameters such as Signal to Interference and Noise Ratio (SINR), Reference Signal Received power (RSRP), Received Signal Strength Indicator (RSSI), Frequency/Time tracking, and so on, based on the CSI-RS. The embodiments include obtaining data measured by sensors of the UE, i.e., sensor measurements, such as beam orientation, beam selection based on the UE position, beam switching based on RSRP of the beams of the UE, and so on. The embodiments include storing Receiver (RX) beam pattern information, channel metrics, sensor measurements, and baseband metrics, in a measurement database.

The embodiments include estimating the feedback parameters using a Machine Learning (ML) model, such as a neural network. The computation of the feedback parameters is based on the baseband metrics, channel metrics, RX beam pattern information, and the sensor measurements. The embodiments include extracting feature vectors by processing the information in the measurement database. The embodiments include inputting the feature vectors to the ML model for computing the feedback parameters. In an embodiment, the feedback parameters can be computed periodically.

The embodiments include predicting the feedback parameters during a reporting time slot, as configured by the gNB, or any other time slot preceding the reporting slot. The predicted values of the feedback parameters are the probable values of the feedback parameters at a future time instance. The embodiments include deriving a pattern of variations in each of the channel metrics, baseband metrics, RX beam pattern information, and, with respect to variation in the sensor measurements. The embodiments include predicting the values of the feedback parameters based on the derived pattern, delay in gNB scheduling Physical Downlink Scheduling Channel (PDSCH), channel conditions, CSI reporting periodicity, block error rate, code rate, and so on.

The embodiments include sending the CSI report to the gNB at the reporting time slot, wherein the CSI report can include the estimated values of the feedback parameters and/or the predicted values of the feedback parameters. The embodiments include training the ML model, to improve the accuracy of the prediction, by minimizing a cost function, such that the entire CSI can be fitted between the CSI reporting occasions (slots). The embodiments include training the ML model to ensure that the predicted and computed values of the feedback parameters closely match the actual values at the time of scheduling. The gNB can schedule the PDSCH based on the feedback parameters in the received CSI report.

The embodiments include generating a plurality of CSI reports by predicting the probable values of the feedback parameters at a plurality of future time instances, at a current time instance. In an embodiment, the plurality of CSI reports is sent to the gNB at the same time. In another embodiment, or each of the plurality of CSI reports are sent to the sent to the gNB periodically during the reporting slots, as per the CSI-RS feedback configuration.

The embodiments include determining an optimal CSI-RS resource allocation and an optimal periodicity for reporting CSI. The embodiments include reporting the optimal CSI-RS resource allocation and the optimal periodicity to the gNB for optimizing the throughput and CSI feedback overhead. The gNB can send updated CSI-RS resources and updated feedback configurations for CSI-RS. The embodiments include determining the optimal CSI-RS resource allocation and the optimal periodicity periodically based on variation in the channel metrics and the baseband metrics.

The embodiments include encoding the CSI report using the ML model to reduce communication overhead; wherein the encoding achieves compression of data constituting the CSI report. In an embodiment, the data constituting a currently generated CSI report can be further compressed based on correlation between the currently generated CSI report and previous CSI reports.

The embodiments include selecting beams for transmitting and receiving data based on Reference Signal Received Power (RSRP) of the beams at a time instance, wherein the RSRP of each of the beams can be predicted using the ML model. The prediction of the RSRP of the beams is based on previous beam measurement data, beam gain pattern and relevance of the beam measurement data.

Methods and systems for reporting CSI and selecting optimal beams using ML. The CSI report is sent to a gNB, which includes feedback parameters, computed and predicted using ML. The feedback parameters are computed using measurements performed using CSI-RS. Values of the feedback parameters likely at future, based on channel variation and the measurements, are predicted using ML. The computed and predicted feedback parameters are included in the CSI report. Multiple CSI reports, including the predicted values of the feedback parameters at future time instances, can be generated at the same time. The multiple reports are sent at the same time or each of the multiple reports is sent periodically. Optimal CSI-RS resource allocation and optimal CSI reporting periodicity are determined using ML and sent to the gNB. The CSI report is encoded using the ML based model. The RSRP of the beams are predicted using ML for beam selection.

This disclosure relates to methods and systems for reporting channel state information and selecting optimal beams using machine learning.

Referring now to the drawings, and more particularly to FIGS. 1 through 23, where similar reference characters denote corresponding features consistently throughout the figures, there are shown preferred embodiments.

In 5$^{th}$ Generation (5G) New Radio (NR) communication systems, a User Equipment (UE) is configured to compute Channel State Information (CSI) parameters such as Rank Indicator (RI), Precoding Matrix Indicator (PMI), Channel Quality Indicator (CQI), CSI-Reference Signals (CSI-RS) Indicator (CRI), and so on, for at least one beam, as per CSI-RS or Synchronization Signal Block (SSB) configuration. Thereafter, the computed parameters can be sent to a Next Generation Node B (gNB), as part of a CSI report or CSI feedback. The CSI report, sent to the gNB, is used for scheduling data transmissions with a delay (known as feedback delay). Prior to the delay, if there is a change in channel conditions, user movement, a change in orientation of the UE, Receiver (RX) beam switch; the CSI report may cease to be optimal. This can affect the throughput of the UE.

FIG. 1 is a flowchart 100 depicting an method for configuring a UE to report CSI to a gNB according to embodiments of the present disclosure. At step 101, a CSI feedback configuration is initialized. The gNB can send a feedback configuration for CSI-RS to the UE. The feedback configuration, received by the UE, includes CSI-MeasConfig, CSI-ResourceConfig, and CSI-ReportConfig. The feedback configuration informs the UE about the feedback parameters that are to be included in the CSI report, periodicity of transmission of the CSI report, time/frequency resource allocation for CSI-RS, and port information for receiving the CSI-RS. On receiving the feedback configuration, the UE can reset previous measurements, which have been measured by the UE for maintaining connection with the gNB. At step 102, the UE can check whether a currently received symbol/slot includes the CSI-RS or SSB. If a received symbol/slot includes CSI-RS/SSB, then, at step 103, the UE can receive reference signal data corresponding to at least one configured Transmitter (TX) beam.

At step 104, the UE can process data included in the reference signal (CSI-RS) for estimating feedback parameters, i.e., CSI parameters. The CSI parameters can be estimated based on channel coefficients, which in turn can be determined based on the CSI-RS data. For example, the UE can compute CSI parameters such as PMI, RI, CQI and LI. The UE also estimates parameters, which can be used for determining whether an existing connection between the UE and the gNB is stable. Example parameters are Reference Signal Received Power (RSRP), Frequency/Time tracking, Signal to Noise and Interference Ratio (SINR), and so on. The CSI parameters can be estimated based on these parameters. Thereafter, the UE can store, at step 105, the estimated CSI parameters in the memory of the UE. At step 106, the UE determines whether the current time instance is a time instance for transmission of the CSI report. At step 107, the UE compiles the estimated parameters in a CSI report. The CSI report can be prepared based on the channel parameters. At step 108, the UE can send the CSI report to the gNB. The UE can store, at step 105, the CSI report that has been sent to the gNB.

If the UE determines, at step 109, that the UE need not send further CSI reports to the gNB; the UE can terminate the method (step 110). If the UE determines, at step 109, that the UE needs to periodically send CSI reports to the gNB, the UE waits to receive a subsequent CSI-RS from the gNB (step 102).

FIG. 2 is a sequence diagram depicting a flow of information involved in sending CSI reports to the gNB according to embodiments of the present disclosure. The UE can, periodically, in a semi-persistent manner, or in an aperiodic manner, send CSI reports to the gNB. As depicted in FIG. 2, initially, the gNB sends a Radio Resource Configuration (RRC) message. The RRC message sent to the UE includes feedback configuration for CSI-RS. The CSI-RS, in turn includes at least one Information Element (IE) such as CSI-MeasConfig, CSI-ResourceConfig, and CSI-ReportConfig. The feedback configuration allows the UE to receive the CSI-RS. The RRC message may be followed by a CSI enable trigger. The CSI enable trigger informs the UE that the gNB is going to send the CSI-RS. The UE can compute the feedback parameters (such as RI, PMI, CQI, CRI, and so on), to be included in the CSI report, using the content in the CSI-RS. The UE can utilize the estimated channel coefficients and the measurements to compute the feedback parameters, as per the RRC message.

FIG. 3 is a timing diagram depicting occurrences of bit error and throughput loss due to the sub-optimality of a received CSI report according to embodiments of the present disclosure. When the gNB needs to send data to the UE, the gNB requests the UE to send measurements, including the CSI report. At time instance t1, the UE can send a CSI feedback report to the gNB. The UE can evaluate the ideal Modulation and Coding Scheme (MCS), and report the ideal MCS to the gNB at t1. The gNB can utilize the CSI report for scheduling downlink data transmission. The downlink data transmission can be initiated at time instance t2. The time interval between the time instances t1 and t2 is the feedback delay. Based on the CSI report received from the UE, the gNB can schedule the transmission of Physical Downlink Control Channel (PDSCH) and choose the appropriate MCS to encode the PDSCH.

If the gain of the channel is high or greater than a predefined gain, the gNB can use a higher order MCS. Conversely, the gNB choose a lower MCS if the gain of the channel is less than the predefined gain. As depicted in FIG. 3, the gNB chooses a high MCS to encode the PDSCH, as per the received CSI report. However, there is a difference between the MCS, as evaluated by the UE at the time instance t2, and the MCS chosen by the gNB (as per the CSI report). As the channel gain is low, usage of a higher order MCS can increase the bit error rate. If Cyclic Redundancy Check (CRC) is used as the error detection, the UE can encounter CRC failures for data bits transmitted between the time instance t2 and a time instance t3. As the UE sends another CSI feedback report to the gNB at the time instance t3, the higher order MCS used by the gNB is not valid beyond the time instance t3.

At time instance t3, the UE sends another CSI feedback report to the gNB. As the channel gain does not improve at the time instance t3, the ideal MCS reported by the UE at time instance t3 is same as the MCS evaluated by the UE at time instance t2. The gNB can process the CSI report at time instance t4. The time interval between the time instances t3 and t4 is the feedback delay. Based on the CSI report received from the UE, the gNB can choose a lower order MCS to encode the PDSCH. However, at time instance t4, the gain of the channel increases. The UE evaluates the MCS at time instance t4. The MCS evaluated by the UE at time instance t4 is greater than the ideal MCS reported to the gNB, by the UE, at time instance t3; considering the increase in the channel gain at time instance t4. This can lead to throughput loss, as the channel capacity is under-utilized.

Thus, the CSI feedback reports sent to the gNB at time instances t1 and t3 are no longer optimal at time instances t2 and t4 respectively, when the CSI feedback reports are being processed by the gNB. This can be seen in the differences between the MCSs chosen by the gNB at time instances t2 and t4 and the MCSs evaluated by the UE at time instances t2 and t4. This leads to an increase in bit error rate and/or throughput loss.

FIG. 4 depicts an example scenario, wherein a CSI report received from a UE becomes sub-optimal due to a change in the orientation of the UE according to embodiments of the present disclosure. As depicted in FIG. 4, the UE receives CSI-RS, followed by PDSCH through a first beam. The UE utilizes the CSI-RS, which is received periodically from the gNB, to generate a CSI-RS report. Based on the CSI report, the gNB can choose appropriate MCS to transmit the subsequent PDSCH. When the orientation of the UE changes, there is a RX beam switch; wherein the UE receives the PDSCH through a second beam. From this instance, till the UE regenerates the CSI report (using the CSI-RS), the CSI report sent by the UE, is no longer optimal. The PDSCH received during this period is likely to be affected by errors, thereby affecting the throughput of the UE.

FIG. 5 is a graph depicting a variation in computational complexity of CSI estimation with respect to variations in CSI type and number of ports of the UE according to embodiments of the present disclosure. The CSI computation is a joint estimation problem, wherein capacity of a channel is maximized with respect to the available choices of rank (RI), precoding matrix (PMI) and channel quality indicator (CQI) (used to determine MCS). For ideal CSI estimation, it may be necessary to jointly estimate PMI and RI, which can be computationally expensive. The complexity of the joint estimation of PMI and RI is likely to increase exponentially with increase in the number of CSI-RS ports and CSI feedback accuracy requirement. For example, computational complexity for CSI type-2 feedback accuracy is greater than computational complexity for CSI type-1 feedback accuracy. As depicted in FIG. 5, for a particular value of the number of ports, the complexity of CSI estimation for type-2 CSI is greater than that for type-1 CSI.

In order to avoid an exponential increase in complexity of CSI estimation, the existing methods tend to use approximation. However, approximating the joint estimation of PMI and RI can lead to an increase in CSI estimation error. The error is likely to increase if data points across multiple resources are combined by averaging weights. The CSI estimation will become independent of number of resource blocks or number of layers. The CSI estimation error increases with respect to number of ports, MCS, and bandwidth; due to accumulation of error, which is contributed by averaging the weights. The weights used for the averaging process are static in general, and may not account for the variations in the channel. Therefore, the approximation may not be accurate.

FIGS. 6A and 6B depict various units of a system 600, configured to generate a CSI report, comprising of parameters, which can be computed and predicted using neural network based learning model, according to embodiments as disclosed herein. As depicted in FIG. 6A, the system 600 comprises a UE 601, a gNB 607 and a cloud server 608. The UE 601 comprises a processor 602, a communication interface 603, a memory 604, a sensor unit 605, and a display 606. As depicted in FIG. 6B, the processor 602 of the UE 601 comprises a computing unit 602a, a database 602b, and a neural network 602c. The UE 601 can generate at least one CSI report and send the at least one CSI report to the gNB 607.

The processor 602 can include parameters, which can be computed and/or predicted using ML based learning models, in the CSI report. The parameters included in the CSI report can be referred to as feedback parameters, as the parameters are reported to the gNB 607 as CSI feedback. Examples of feedback parameters include, but not limited to, Precoding Matrix Indicator (PMI), Channel Quality Indicator (CQI), CSI-RS Indicator (CRI), Rank Indicator (RI), and so on. In an embodiment, the ML based learning model is a Neural Network 602c, which is included in the processor 602. The processor 602 can compute and predict the values of the feedback parameters using the neural network 602c.

The UE 601, through the communication interface 603, can receive a Radio Resource Configuration (RRC) message. The gNB 607 can include a feedback configuration for CSI-RS in the RRC message. The feedback configuration comprises Information Elements (IEs) such as CSI-MeasConfig, CSI-ResourceConfig, CodebookConfig, and CSI-ReportConfig.

The CSI-MeasConfig IE can indicate the type of measurement that the UE 601 needs performed. The types include interference measurement and channel measurement. For channel measurement, the UE 601 can measure metrics that allow the UE 601 to maintain a wireless connection between the UE 601 and the gNB 607. For interference measurement, the UE 601 can determine the presence of other UEs that are interfering with the UE 602.

The CSI-ResourceConfig IE includes information that is pertaining to reception of CSI-RS such as time slots in which the CSI-RS will be transmitted by the gNB 607, frequency of the CSI-RS, ports through which the CSI-RS can be received by the UE 601, and so on. The CSI-ReportConfig IE can include CSI reporting periodicity, time slots in which the CSI report is to be sent by the UE 601 to the gNB 607, feedback parameters that are to be included in the CSI report by the UE 601, and so on.

The CodebookConfig can provide an indication to the UE 601 whether the CSI feedback configuration is Type-1 or Type-2. For both Type-1 and Type-2 CSI reporting in NR, the gNB 607 can specify CSI reporting configuration in the CodebookConfig. For Type-1 CSI reporting, the UE 601 can send gNB 607 antenna port configuration, and a set of values of the feedback parameters (such as PMI and RI), which can be considered as valid, to the gNB 607. The gNB 607 can choose at least one of the reported values from the range, provided to the gNB 607 by the UE 601. For Type-2 CSI reporting, the gNB 607 can specify phaseAlphabetSize, subbandAmplitude, and numberofBeams, which specify a set of values of the feedback parameters), which can be considered by the UE 601 as valid for reporting to the gNB 607. The gNB 607 can choose at least one of the values from the set of reported values.

The UE 601, through the communication interface 603, can receive the CSI-RS and/or SSB from the gNB. The CSI-RS and/or SSB can be considered as radio parameters. The computing unit 602a of the processor 602 can measure baseband metrics, channel metrics, and so on, based on the information included in the CSI-RS and/or SSB. Examples of the channel metrics include, but not limited to, channel noise, channel coefficients, frequency response of the channel, beam channel estimates, and so on. Examples of the baseband metrics include, but not limited to, Signal to Interference and Noise Ratio (SINR), Frequency/Time tracking, CSI-RSRP, Transmission Configuration Indicator (TCI) state mapping, SSB-RSRP, Received Signal Strength Indicator (RSSI), Doppler Shift, Doppler spread, average delay, delay spread, block error statistics, and so on. The computing unit 602a of the processor 602 can retrieve the Receiver (RX) beam pattern information stored in the memory 604.

The sensor unit 605 can measure parameters such as, but not limited to, beam orientation, beam selection based on UE 601 position, beam switching based on RSRP of the beams, and so on. The parameters measured by the sensor unit 605 can be referred to as sensor measurements. The processor 602 can store the baseband metrics, channel metrics, RX beam pattern information, and the sensor measurements, in the database 602b.

The neural network 602c, for preprocessing, obtains inputs from the database 602b, viz., channel metrics, baseband metrics, RX beam pattern information, and sensor measurements. The preprocessing involves performing operations on the inputs, such as scaling and combining. The neural network 602c layers can extract a plurality of feature vectors and refine the plurality of feature vectors to compute the feedback parameters. The neural network 602c can periodically compute at least one feedback parameter based on the feedback configuration. In an embodiment, the neural network 602c can compute at least one feedback parameter, if the current slot received by the UE 601 includes the CSI-RS. In another embodiment, the neural network 602c can compute at least one feedback parameter in a time slot prior to or after the CSI-RS slot.

The neural network 602c can predict the probable values of the feedback parameters at a future time instance as configured by the gNB 607 in the CSI-ReportConfig IE. For example, consider that the CSI-ReportConfig IE indicates that the UE 601 needs to report the values of PMI and RI to the gNB 607 in a CSI report. The CodebookConfig can specify a set of values for each of the PMI and RI, which are considered as valid by the gNB 607 for reporting. The neural network 602c of the UE 601 can compute and/or predict a plurality of values of PMI and a plurality of values of RI for type-1 or type-2 CSI reporting.

In an embodiment, the neural network 602c can predict at least one feedback parameter, if the current slot is the reporting slot. In another embodiment, the neural network 602c can predict the at least one feedback parameter in a time slot prior to the reporting slot.

The neural network 602c predicts the probable values of the feedback parameters which the feedback parameters are likely to assume at a future time instance 't+Δ', at time instance 't'. The neural network 602c can select the future time instance based on the likelihood of variations, found during training stage, in at least one of channel metrics, baseband metrics, RX beam pattern information, sensor measurements, delay in scheduling transmission of PDSCH, block error rate, and difference between the code rate estimated by UE 601 and code rate selected by gNB 607 for scheduling transmission of the PDSCH. If the variation is high, then A will be low. On the other hand, if the variation is low, then A will be high.

The neural network 602c can determine a pattern of variations in each of the baseband metrics, channel metrics, and RX beam pattern information, with respect to the variation in the sensor measurements. For example, the UE 601 may predict a value of CRI (a feedback parameter) based on a direction of rotation of the UE 601. The UE 601 can utilize the sensor unit 605 to obtain information about the rotation of the UE 601, which is a part of the sensor measurements. The UE 601 can determine the changes in the code rate with respect to the rotation of the UE 601, which can influence the baseband metrics such as RSRP.

The neural network 602c can predict the probable values of the feedback parameters at the future time instances, based on the determined pattern of variations, and variations in factors such as, but not limited to, (feedback) delay in scheduling the PDSCH, based on the CSI report, by the gNB 607; block error rate pertaining to reception of PDSCH; CSI reporting periodicity; code rate used for transmission of PDSCH; and so on. In an example, at a time instance 't', the UE 601 can predict the probable values of the feedback parameters at a future time instance 't+4', wherein the time interval between the time instances 't' and 't+4' is 4 milliseconds.

The prediction of feedback parameters by the neural network 602c can be suited to achieve scenario specific behavioral adaptation. For example, the number of time samples to be used for generating the input feature vectors is high, if the Doppler spread is high; as compared to the scenario, where the Doppler spread is low.

The neural network 602c can be trained to accurately predict the feedback parameters. In an embodiment, the prediction accuracy can be improved by minimizing a cost function, such that the entire CSI can be fitted between the CSI reporting slots. The neural network 602c training ensures that the predicted values of the feedback parameters match the actual counterpart values at the time of scheduling the PDSCH.

In an embodiment, the neural network 602c can be trained using an online approach, for optimizing the prediction performance of the neural network 602c. The online approach involves iteratively updating the weights of activation elements of different layers of the neural network 602c. The neural network 602c can be trained either by the UE 601 or by a cloud server 608. In case the neural network 602c is trained by the cloud server 608, the UE 601 needs to send data such as the contents stored in the database 602b, parameters involved in the prediction of the feedback parameters, predicted values of the feedback parameters, computed values of the feedback parameters, and so on. The cloud server 608 can determine the optimal weights of the activation elements based on the data sent by the UE 601. The cloud server 608 can send the optimal weights to the UE 601. The UE 601, can, thereafter, update the weights of the neural network 602c.

In an embodiment, the neural network 602c can be trained based on a difference between the actual values of the feedback parameters and the predicted values of values of the feedback parameters. The actual values of the feedback parameters can be obtained by computing the values of the feedback parameters at the future time instance (for example: 't+2'). The predicted values are the probable values of the feedback parameters, which the feedback parameters are likely to assume at the future time instant 't+2', wherein the probable values were predicted by the neural network 602c at time instant 't', prior to sending the CSI report to the gNB 607.

In an embodiment, the neural network 602c can be trained based on a block error rate pertaining to PDSCH reception.

The neural network 602c is trained to determine values of weights of activation elements of the layers of the neural network 602c, which are likely to be optimal for accurately predicting the probable values of the feedback parameters at the future time instance. During the course of prediction, the UE 601 can obtain data that is required for training the neural network 602c. The data that is required for training the neural network 602c comprises of: difference between the actual values of the feedback parameters at the future time instance and the predicted values of the feedback parameters, block error rate for PDSCH reception, and measurement data comprising of the baseband metrics, channel metrics, sensor measurements and RX beam pattern information. The neural network 602c can determine the optimal values of the weights of activation elements based on the training data.

The processor 602 can generate a CSI report in a CSI reporting slot or a time slot prior to the reporting time slot, wherein the CSI report can be generated by compiling the at least one computed feedback parameter and/or the at least one predicted feedback parameter. The UE 601 can send the CSI report to the gNB 607 in a reporting time slot. The gNB 607 can process the CSI report, received from the UE 601. The gNB 607 can select a value, amongst a plurality of the values, for each feedback parameter. The gNB 607 can schedule the PDSCH, based on the feedback parameters included in the CSI report, with a feedback delay.

In an embodiment, the neural network 602c can generate a plurality of CSI reports by predicting the probable values of the feedback parameters at a plurality of future time instances. If the UE 601 is confident that the channel conditions are not likely to change till a foreseeable future time period, or if the UE 601 can predict the values, which are likely to be assumed by the feedback parameters from the current time instance till the foreseeable future time period; the UE 601 can predict the values of the feedback parameters at the future time instances.

Similarly, if the UE 601 is able to predict with a high degree of certainty, that the Doppler Spread till the foreseeable future time period is not likely to impact the block error rate, the UE 601 can predict the values, which the feedback parameters are likely to assume till the foreseeable future time period.

The UE 601 can derive the confidence based on the past CSI reports and delay in processing CSI reports. The UE 601 can also derive the confidence based on a pattern of variations in each of the baseband metrics, channel metrics, and RX beam pattern information: with respect to variations in each of the Doppler Spread, block error rate pertaining to PDSCH reception, sensor measurements, difference between the optimal code rate evaluated by the UE 601 and the code rate chosen by the gNB 607 to schedule PDSCH.

In an example, at the time instance t, the UE 601 can predict the probable values of the feedback parameters at time instances 't+4', 't+8' and 't+12', wherein the interval between the time instances is 4 ms. In an embodiment, the UE 601 can send the plurality of CSI reports at the time instance t.

In another embodiment, each of the plurality of CSI reports can be sent to the sent to the gNB periodically during the reporting slots. Consider that the reporting time slots, as per the CSI-RS feedback configuration, are at time instances 't+2', 't+6', and 't+10'. At time instance 't+2', the UE 601 sends a CSI report, which includes the values of the feedback parameters likely at time instance 't+4'. At time instance 't+6', the UE 601 sends another CSI report, which includes the values of the feedback parameters likely at time instance 't+8'. At time instance 't+10', the UE 601 sends yet another CSI report, which includes the values of the feedback parameters likely at time instance 't+12'.

In an embodiment, the neural network 602c can determine an optimal CSI-RS resource allocation and an optimal periodicity of sending CSI reports. The UE 601 can send the optimal CSI-RS resource allocation and the optimal periodicity for sending CSI reports, to the gNB 607, for optimizing the throughput and CSI feedback overhead. For example, if the channel is fast-varying due to a high Doppler spread, the periodicity of sending CSI reports needs to be reduced. The UE 601 also needs to receive CSI-RS resources frequently to predict the channel metrics. This is because; the fast-varying nature of the channel renders the CSI report inaccurate, when the gNB 607 processes the CSI report. The gNB 607 may choose to encode the PDSCH at a code rate based on the CSI report sent by the UE 601, which will not be supported by the channel. As a result, the block error rate will increase. Once the gNB 607 receives the optimal CSI-RS resource allocation and the optimal periodicity of sending CSI reports, the gNB 607 can update the CSI-RS feedback configuration, whereby frequency of sending CSI-RS is increased and the reporting slot periodicity is decreased.

The neural network 602c can predict the RSRP of all beams of the UE 601. The prediction allows the UE 601 to select optimal beams for transmitting and receiving data, as the optimality of a beam can be determined based on the RSRP associated with the beam. The neural network 602c can predict the optimal beam at a current time instance and beam(s) which are likely to be optimal at future time instances. The neural network 602c can utilize the previous and current beam measurement data, wherein the beam measurement data includes beam orientation and RX beam pattern information based on RSRP associated with the beams; beam gain pattern; and relevance of previous beam measurement data at a current time instance; for predicting the RSRP associated with the beams of the UE 601 at the current time instance.

The neural network 602c can determine a pattern of variation in gain of a beam during a time interval. The pattern can specify the gain of the beam when the beam was previously optimal and the gain of the beam at present. The neural network 602c can determine the relevance of previous beam measurement data at the current time instance. The relevance can be determined based on a correlation between the previous beam measurement data and current beam measurement data. The neural network 602c can predict the RSRP of other beams of the UE 601 at the current time instance. The UE 601 considers the beam with the highest predicted RSRP as the optimal beam at a time instance.

The neural network 602c can encode the CSI report in order to reduce communication overhead. The encoding leads to reduction in the number of symbols of the CSI report data. For example, if the CSI report data, generated by the UE 601, comprises of 'N' symbols, the neural network 602c can encode the CSI report data to 'K' symbols, wherein K<N. Thus, the encoding can result in reduction in the number of symbols of the CSI report data. In an embodiment, the neural network 602c can use the previously generated CSI reports to encode a currently generated CSI report. The neural network 602c can determine the correlation between the currently generated CSI report and previous CSI reports. Based on the degree of correlation, the number of symbols of the encoded CSI report data can be further reduced. Considering the example, the neural network 602c encodes the encoded CSI report data into 'P' symbols, wherein P<K.

FIGS. 6A and 6B show exemplary units of the system 600, but it is to be understood that other embodiments are not limited thereon. In other embodiments, the system 600 may include less or more number of units. Further, the labels or names of the units are used only for illustrative purpose and does not limit the scope of the 23. One or more units can be combined together to perform same or substantially similar function in the system 600.

FIG. 7 depicts an example timing diagram, wherein there is a similarity between Modulation and Coding Scheme (MCS) chosen by the gNB 607 and an optimal MCS evaluated by the UE 601, according to embodiments as disclosed herein. The similarity between the MCS chosen by the gNB 607 and the optimal MCS evaluated by the UE 601 is achieved due to inclusion of accurately predicted feedback parameters, by the UE 601, in the CSI report. The neural network 602c can be trained to predict the feedback parameters based on the channel state and CSI reporting periodicity to ensure that the predicted values of the feedback parameters match closely with the actual values of the feedback parameters CSI at the time of scheduling the PDSCH.

As depicted in FIG. 7, at time instance t1, the UE 601 sends a CSI report. The CSI report includes the probable values of the feedback parameters at the time instance t1+Δ (t2). The UE 601 can predict that the gain of the channel is likely to reduce at time instance t2; and accordingly predicts the the probable values of the feedback parameters. The gNB 607, based on the values included in the received CSI report, can select an appropriate MCS. The gNB 607 can deduce that the gain of the channel is decreasing, based on the values of the feedback parameters. Therefore, the gNB 607 can choose a lower-order MCS (indicated by the dotted line). As the optimal MCS evaluated by the UE 601 closely matches the MCS chosen by the gNB 607, the CSI reported by the UE at time instance t1 may correspond to the CSI at the time instance t2.

At time instance t3, the UE 601 sends another CSI report. The CSI report includes the probable values of the feedback parameters at the time instance t3+Δ (t4). The UE 601 can predict that the gain of the channel is likely to increase at time instance t4; and accordingly predicts the the probable values of the feedback parameters. Based on the values of the feedback parameters in the CSI report, the gNB 607 can choose a higher-order MCS (indicated by the dotted line). As the optimal MCS evaluated by the UE 601 closely matches the MCS chosen by the gNB 607, the CSI reported by the UE at time instance t3 may correspond to the CSI at the time instance t3+Δ. As the feedback parameters, included in the CSI report processed by the gNB 607, is similar to the feedback parameters included in the CSI report sent by the UE 601, the block error rate is lower and the throughput is higher.

FIG. 8 is a flowchart 800 depicting a method for generating a CSI report, comprising of parameters, which can be computed and predicted using a neural network based learning model, according to embodiments as disclosed herein. At step 801, the method includes receiving a feedback configuration, by the UE 601, from the gNB 607. The feedback configuration is relevant to reception of CSI-RS and/or SSB. The feedback configuration can be used by the UE 601 to send the CSI as a feedback report. The UE 601 can receive the feedback configuration in a RRC message. The RRC message includes CSI-MeasConfig, CSI-ResourceConfig, CSI-ReportConfig, and CodebookConfig.

The CSI-MeasConfig IE can indicate whether the UE 601 needs to perform at least one of interference measurement and channel measurement. The CSI-ResourceConfig IE can include information pertaining to allocation of time/frequency resources for CSI-RS reception such as time slots in which the UE 601 can expect to receive the CSI-RS, frequency of the CSI-RS, and ports through which the CSI-RS can be received. The CSI-ReportConfig IE can include time slots in which the UE 601 can send the CSI report, feedback parameters to be included in the CSI report, and so on. The CodebookConfig indicates to the UE 601 as to whether the CSI feedback configuration, provided to the UE 601, is pertaining to type-1 CSI or type-2 CSI.

At step 802, the method includes receiving CSI-RS and/or SSB, by the UE 601, if a current slot includes the CSI-RS and/or SSB. The UE 601 determines whether a current slot includes the CSI-RS, and which future slot is likely to include the CSI-RS; based on the information included in the CSI-ResourceConfig. The embodiments herein utilize the CSI-RS to estimate channel metrics and basement metrics. Examples of channel metrics include, but not limited to, frequency response of the channel, channel noise, and channel coefficients. Examples of basement metrics include, but not limited to, SINR, CSI-RSRP, SSB-RSRP, Frequency/Time tracking, TCI state mapping, RSSI, Doppler Spread, Doppler spread, average delay, delay spread, block error statistics, and so on.

The embodiments include computing baseband metrics based on the information in the CSI-RS and/or SSB. The embodiments include determining RX beam pattern information based on the basement metrics. The embodiments obtain sensor measurements (from the sensor unit 605), which comprises at least one of beam orientation, beam selection based on the UE position, and beam switching pattern based on RSRP of the beams of the UE 601.

At step 803, the method includes computing, by the UE 601, feedback parameters based on the information included in the CSI-RS and/or SSB. The embodiments compute the feedback parameters periodically, wherein the periodicity is indicated in the CSI-ResourceConfig and CSI-ReportConfig IEs. The embodiments include computing the feedback parameters based on at least one of the estimated channel metrics, basement metrics, sensor measurements, and RX beam pattern information. Examples of feedback parameters include, but not limited to, PMI, CQI, CRI, RI, and so on.

The embodiments include computing the feedback parameters using a ML based learning model. In an embodiment, the ML based learning model can be a neural network 602c. The embodiments include generating feature vectors using at least one of channel metrics, basement metrics, RX beam pattern information, and sensor measurements. The feature vectors can be provided to the neural network 602c, for computing the feedback parameters.

At step 804, the method includes predicting, by the UE 601, probable values of the feedback parameters at future time instances, at a current time instant. The prediction is performed based on at least one of channel metrics, basement metrics, RX beam pattern information and to sensor measurements. The prediction is also based on feedback delay, block error rate, and code rate. The embodiments include predicting the feedback parameters at future time instances if the current slot is a reporting slot. In an embodiment, the values of the feedback parameters are predicted prior to or during a CSI reporting slot. The embodiments include predicting the values those feedback parameters, which have been specified in the CSI-Report-Config.

The embodiments include selecting the future time instances based on the likelihood of variation in at least one of baseband metrics, channel metrics, RX beam pattern information, sensor measurements, block error rate, and difference between an optimal code rate estimated by UE 601 and a code rate selected by the gNB 607 for scheduling PDSCH transmission. The prediction of the feedback parameters can be suited to achieve scenario specific behavioral adaptation.

The embodiments include deriving pattern of variations in each of the channel metrics, baseband metrics, and RX beam pattern information, with respect to variation in sensor measurements. The embodiments include predicting the probable values, which the feedback parameters are likely to assume at the selected future time instances, based on the pattern, wherein factors such as delay in gNB 607 scheduling PDSCH, CSI reporting periodicity, block error rate, code rate, and so on, are considered during the prediction of the probable values of the feedback parameters.

The embodiments include training the neural network 602c by minimizing a cost function, such that the entire CSI can be fitted between periodic CSI reporting slots. This can result in the prediction of accurate values. The embodiments include training the neural network 602c to ensure that the predicted values of the feedback parameters closely match with the actual values of the feedback parameters when the PDSCH is scheduled.

At step 805, the method includes generating, by the UE 601, at least one CSI report comprising the computed feedback parameters and the predicted values of the feedback parameters. The embodiments include generating the CSI report at the reporting time slot. In an embodiment, a single CSI report is generated, wherein the CSI report includes the predicted values of the feedback parameters at a single future time instance. In an embodiment, a plurality of CSI reports is generated, wherein the plurality of CSI reports include the predicted values of the feedback parameters at multiple future time instances.

At step 806, the method includes sending, by the UE 601, the at least one CSI report to the gNB 607, if the current slot is a reporting time slot. In an embodiment, the plurality of CSI reports is sent to the gNB 607 at the same time. In another embodiment, or each of the plurality of CSI reports are sent to the gNB 607 during the periodic reporting slots, as per the CSI-RS feedback configuration.

The various actions in the flowchart 800 may be performed in the order presented, in a different order, or simultaneously. Further, in some embodiments, some actions listed in FIG. 8 may be omitted.

FIG. 9A depicts an example joint neural network model for jointly estimating and predicting a plurality of feedback parameters, according to embodiments as disclosed herein. The joint neural network model allows joint optimization of the feedback parameters included in the CSI report. The input to the joint neural network model comprises of past CSI data, Doppler spread, and Hybrid Automatic Repeat reQuest (HARQ) information. The joint neural network model can accurately predict the feedback parameters, as the feedback parameters can be jointly optimized. This is particularly applicable if the channel is fast-changing (for example: high Doppler spread due to mobility).

FIG. 9B depicts an architecture of the joint neural network model, according to embodiments as disclosed herein. As depicted in FIG. 9B, the joint neural network model comprises of 'N' layers and 'M' activation elements in each of the 'N' layers. The inputs can be derived from the measurement database (database 602c). The joint neural network can fetch the previously measured channel metrics, baseband metrics, RX beam pattern information, and sensor measurements. Additionally, parameters such as Doppler spread and HARQ information can be provided as input. Each L1 level input can be enabled or disabled by a switch.

The input can be processed by a data pre-processing layer, which can use methods such as data normalization, in order to generate input feature vectors. The joint neural network model can estimate and predict feedback parameters such as CRI, RI, PMI, CQI, LI, and L1-RSRP.

FIG. 10 depicts an example hierarchical neural network model for individually computing and predicting feedback parameters, according to embodiments as disclosed herein. As depicted in FIG. 10, consider that the hierarchical neural network model is configured to compute and predict RI, PMI, and CQI, based on the CSI feedback configuration. The hierarchical neural network model includes three neural networks for predicting each of the feedback parameters, RI, PMI, and CQI. The individual computation and prediction of the feedback parameters, using individual neural networks, can simplify the training of the neural networks and reduce the computational complexity of the computation and prediction.

The hierarchical neural network model can be trained to customize averaging of weights of the individual neural networks, based on at least one of number of ports and number of resource blocks; in order to prevent scaling of error with respect to amount of averaging. Each neural network can be individually trained to learn optimal averaging weights based on the number of ports and the number of resource blocks.

The output of the neural network, which is trained to predict the optimal rank (RI), the number of resource blocks and the number of ports, can be inputted to the neural networks, which are trained to predict the CQI and PMI respectively. The RI, along with the preprocessed channel information, can be utilized for predicting the CQI and PMI.

Figure 11:
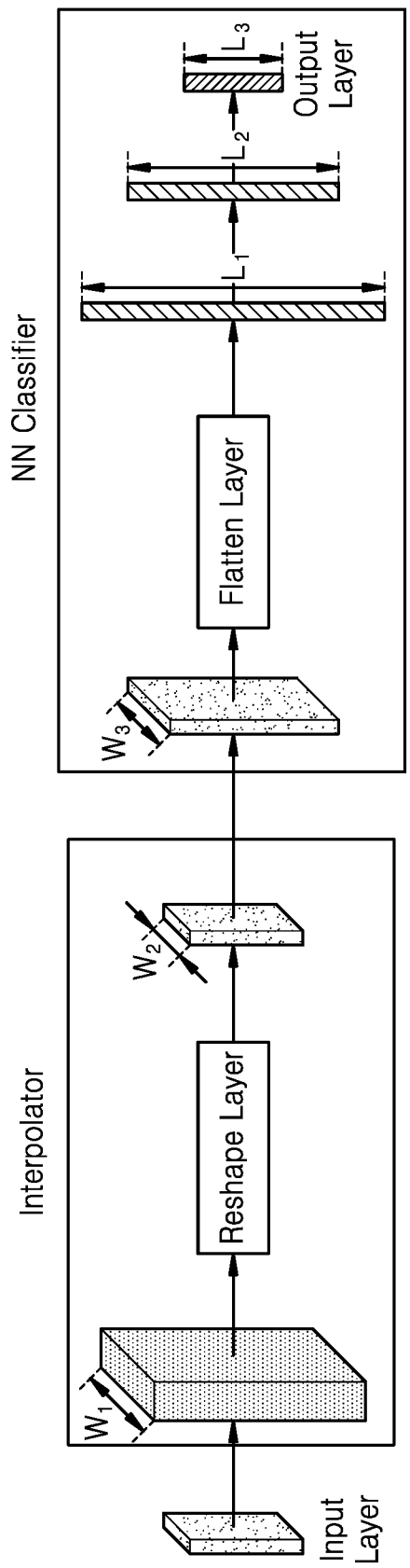
FIG. 11 depicts an architecture of an example Deep Neural Network (DNN) model for computing and predicting feedback parameters, according to embodiments as disclosed herein.

FIG. 11 depicts an architecture of an example Deep Neural Network (DNN) model for computing and predicting feedback parameters, according to embodiments as disclosed herein. The neural network 602c, included in the processor 602 of the UE 601, can be a DNN model. As depicted in FIG. 11, the architecture of the DNN model comprises a Neural Network (NN) channel predictor and a NN classifier, for computing and predicting the feedback parameters based on the CSI-RS. The architecture of the DNN model includes 3-Dimensional (3D) and 2D Convolutional Neural Network (CNN) layers, and L1 and L2 Fully Connected layers. The NN channel predictor and the NN classifier can be trained individually. The NN channel predictor can be trained to compute the baseband metrics and channel metrics based on past CSI data. The NN classifier can be trained to predict, at a time instance 't', the probable values of the feedback parameters at a time instance 't+i'. The CNN can be used for predicting feedback parameters, such as PMI, RI, based on delay in allocating downlink resources by the gNB 607.

The past CSI data can include feedback parameters, which have been computed based on previously measured channel metrics, baseband metrics, RX beam pattern information, and sensor measurements. The past CSI data, along with the contents of the database 602*b*, can be fed to the input layer. The contents of the measurement database (channel metrics, baseband metrics, RX beam pattern information, and sensor measurements) can be updated periodically based on the received CSI-RS. The input layer can be, therefore, fed with past CSI data, HARQ information, current MCS, and Doppler spread.

The input layer is connected to a 3D convolutional layer of the NN channel predictor. The NN channel predictor includes a 'reshape' layer. In an example, the 'reshape' layer can convert a 4×3 input to a 6×2 output. The output of the 3D convolutional layer is fed as input to the 'reshape' layer. The output of the 'reshape' layer is fed as input to a 2D convolutional layer of the NN channel predictor.

The output 2D convolutional layer of the NN channel predictor is provided as input to a 2D convolutional layer of the NN classifier. The 2D convolutional layer can receive the computed feedback parameters from the NN channel predictor. The NN classifier can include a 2D convolutional layer, a 'flatten' layer, a L1 fully connected layer, a L2 fully connected layer, and an output layer. In an example, the 'flatten' layer can convert a 4×3 input to a 12×1 output. The output of the 2D convolutional layer is fed as input to the 'flatten' layer. The output of the 'flatten' layer is fed as input to the L1 layer. The output of the L1 layer is fed as input to the L2 layer. The output of the L2 layer is fed to the output layer. The output of the L2 layer provides the predicted values, which the feedback parameters are likely to assume at future time instances. In each of the layers, feature vectors are determined or refined, as information flows through the layers.

Figure 12:
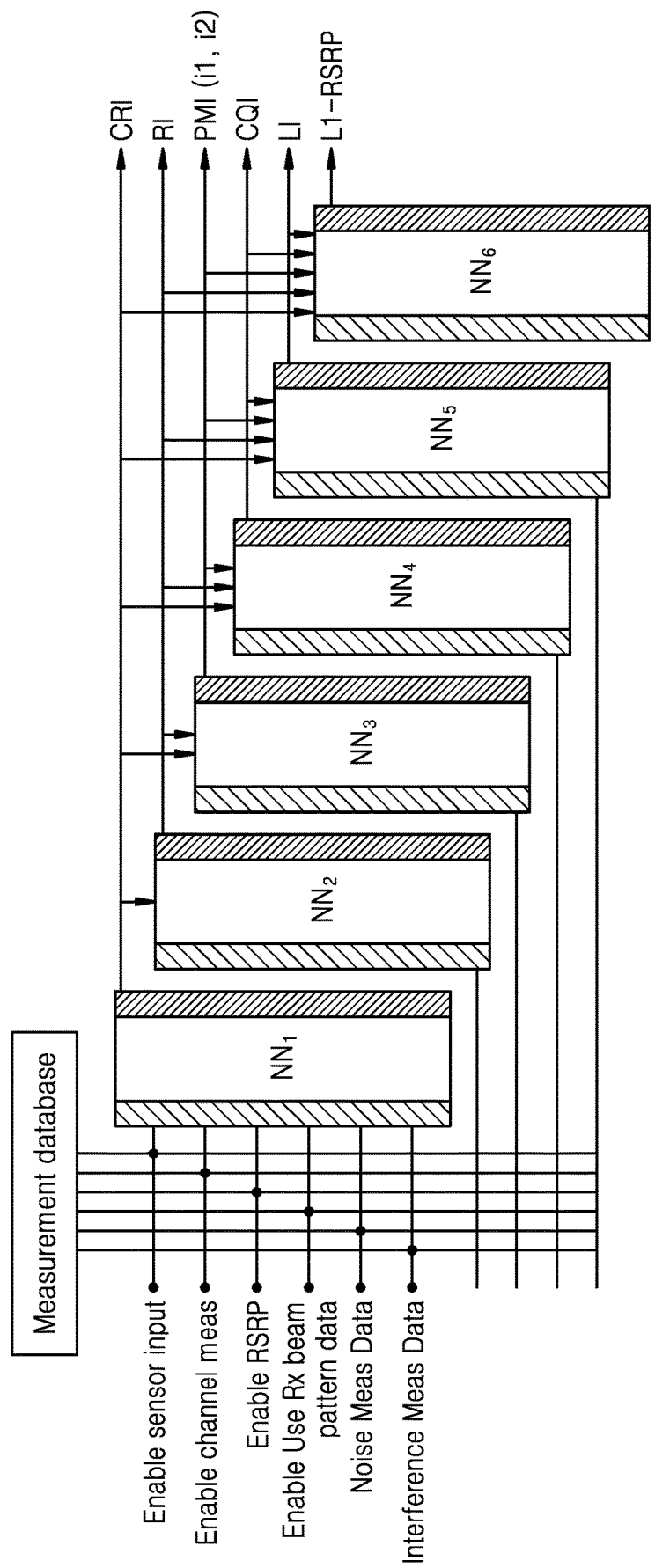
FIG. 12 depicts an architecture of an example cascade neural network model to compute and predict feedback parameters, according to embodiments as disclosed herein.

FIG. 12 depicts an architecture of an example cascade neural network model to compute and predict feedback parameters, according to embodiments as disclosed herein. As depicted in FIG. 12, the cascaded neural network comprises six neural networks for predicting the feedback parameters, which are included in the CSI report. Each of the six neural networks can be trained individually. The inputs to the neural network comprises of the contents stored in a measurement database (database 602*b*), i.e., channel metrics, baseband metrics, RX beam pattern information, and sensor measurements. The contents of the measurement database can be inputted to all neural networks of the cascaded neural network. Additionally, the output of a neural network is fed as one of the inputs of a subsequent neural network.

Each neural network can predict a feedback parameter individually, and the predicted feedback parameter can be used by a subsequent neural network to predict another feedback parameter. In an example, consider that the CSI-ReportConfig IE indicates that the UE 601 needs to report CRI, RI, PMI, CQI, LI, and L1-RSRP.

The first neural network can predict the CRI based on the contents in the measurement database. The second neural network can predict the RI based on the contents in the measurement database and the predicted value of CRI. The third neural network can predict the PMI based on the contents in the measurement database and the predicted value of RI. The fourth neural network can predict the CQI based on the contents in the measurement database and the predicted value of PMI. The fifth neural network can predict the LI based on the contents in the measurement database and the predicted value of PMI. The sixth neural network can predict the L1-RSRP based on the contents in the measurement database and the predicted value of LI.

FIGS. 13A and 13B are example sequence diagrams depicting the generation of a plurality of CSI reports at the same time instance, according to embodiments as disclosed herein. The UE 601 can generate 'M' CSI reports, at the same time, based on the received CSI-RS. Consider that the 'M' CSI reports are generated at a time instance 't'. In order to generate 'M' CSI reports, the UE 601 needs to predict values, which the feedback parameters are likely to assume at 'M' future time instances. Consider that the future time instances are 't+Δ', 't+2 Δ', . . . , 't+(M−1)*Δ'.

If the UE 601 is confident that the channel conditions are not likely to change prior to the time instance 't+(M−1)*Δ', or if the UE 601 is able to deduce a probable pattern of change in the channel conditions till the time instance 't+(M−1)*Δ', the UE 601 can predict the values, which the feedback parameters are likely to assume at the future time instances 't+Δ', 't+2 Δ', . . . , t+(M−1)*Δ'. If the UE 601 is confident that the Doppler Spread prior to the time instance 't+(M−1)*Δ' is not likely to impact the block error rate, the UE 601 can predict the values, which the feedback parameters are likely to assume at the future time instances 't+Δ', 't+2 Δ', . . . , 't+(M−1)*Δ'.

As depicted in FIGS. 13A and 13B, initially, the gNB 607 sends a feedback configuration to the UE 601 in a RRC message. The feedback configuration for CSI-RS includes CSI-MeasConfig, CSI-ResourceConfig, and CSI-ReportConfig. The RRC message is followed by CSI enable trigger. The CSI enable trigger informs the UE 601 that the gNB 607 is going to send the CSI-RS. The UE 601 can compute the feedback parameters (such as RI, PMI, CQI, CRI, RSRP, and so on), to be included in the CSI report, using the CSI-RS. The UE 601 can generate the plurality of CSI reports based on the computed and predicted feedback parameters, as per the feedback configuration included in the RRC message.

The number of CSI reports that can be generated by the UE 601 can be dynamically updated based on the channel conditions. Based on the predicted Doppler spread and performance limitations of the neural network 602*c*, the UE 601 can choose to generate an optimal number of CSI reports, such that each report is accurate enough by a predefined threshold. The UE 601 may not predict CSI reports until all 'M' reports have been transmitted.

As depicted in FIG. 13A, the UE 601 can periodically send a CSI report, amongst the 'M' CSI reports, to the gNB 607, until all 'M' CSI reports have been sent to the gNB 607. Consider that the UE 601 sends the first CSI report at the time instance 't', wherein the reporting slot (as per the received feedback configuration) occurs at the time instance 't'. The UE 601 can send the second CSI report in the subsequent time slot at the time instance 't+Δ'. The UE 601 can send the $M^{th}$ CSI report at the time instance 't+(M−1)

*Δ'. The UE 601 can compute and predict the feedback parameters, as per the feedback configuration, for generating 'M' CSI reports, during a reporting slot after the time instance 't+(M−1)*Δ'. As the UE 601 had generated CSI reports, which need to be sent to the gNB 607 at future time instances, the UE 601 can choose to skip performing measurement related to the CSI-RS, received prior to the time instance 't+(M−1)*Δ'. This allows the UE 601 to save power.

As depicted in FIG. 13B, the UE 601 can send the M CSI reports at the time instance 't'. The UE 601 may skip performing CSI-RS related measurements for some CSI-RS instances in a time interval M Δ. This allows the UE 601 to save power. The UE 601 may ignore the CSI-RS from the gNB 607 for the time interval M Δ. The UE 601 can compute and predicted feedback parameters, as per the feedback configuration, for generating M' CSI reports, during a reporting slot after the time instance 't+(M−1)*Δ'.

FIG. 14 is an example sequence diagram depicting the computation of optimal CSI-RS resource allocation and optimal periodicity of sending CSI reports to the gNB 607, according to embodiments as disclosed herein. The UE 601 can compute the updated values of baseband metrics, channel metrics and RX beam pattern information, based on the latest CSI-RS received from the gNB 607. The UE 601 can determine block error rate, and differences between optimal code rate and scheduled code rate.

The UE 601 can perform measurements using the sensor unit 605, to determine beam parameters and orientation.

Based on the measurements and determination, the UE 601 can determine the optimal CSI-RS resource allocation and an optimal periodicity (time interval between reporting slots) of sending CSI reports to the gNB 607. The UE determines the optimal CSI-RS resource allocation and the optimal periodicity to optimize the throughput and CSI feedback overhead. For example, if the UE 601 determines that there is a significant difference between the previous and current measurements, the UE 601 can conclude that the channel is fast-varying. The UE 601 may compute the optimal periodicity of sending CSI reports, wherein the computed optimal periodicity is less than the time interval between reporting slots.

The UE 601 can send the optimal CSI-RS resource allocation and the optimal periodicity for sending CSI reports, to the gNB 607, after sending the latest CSI report at the reporting time slot. Once the gNB 607 receives the optimal CSI-RS resource allocation and the optimal periodicity of sending CSI reports, the gNB 607 can update the CSI-RS feedback configuration.

FIGS. 15A and 15B depict encoding and decoding of CSI reports for reducing overhead, according to embodiments as disclosed herein. The ML model (neural network 602c) can encode the CSI report by compressing data included in the CSI report. The ML model can set the mode to either '1' or '2'. If the mode is set to '1', the CSI report data, constituting of 'N' symbols, can be encoded to 'K' symbols, wherein K<N. If the mode is set to '2', the ML model can utilize past CSI reports to encode a currently generated CSI report. The ML model can determine a correlation between the currently generated CSI report and the past CSI reports. Based on the degree of correlation, the currently generated CSI report can be encoded, wherein the CSI report data, constituting of 'N' symbols, can be encoded to 'P' symbols, wherein P<N. It can be noted that, P<K<N. Therefore, if there is correlation between current and past CSI reports, using mode '2' allows encoding the current CSI report to a lesser number of symbols, compared to mode '1'.

The gNB 607 can decode the encoded CSI report. The decoding involves determining whether mode '1' or mode '2' was used for encoding the CSI report. If it is determined that mode '1' was used, the gNB 607 can decode 'K' symbols of the encoded CSI report to 'N' symbols of the original CSI report, generated by the UE 601. If it is determined that mode '2' was used, the gNB 607 can decode 'P' symbols to 'N' symbols to obtain the original CSI report.

Figure 16:
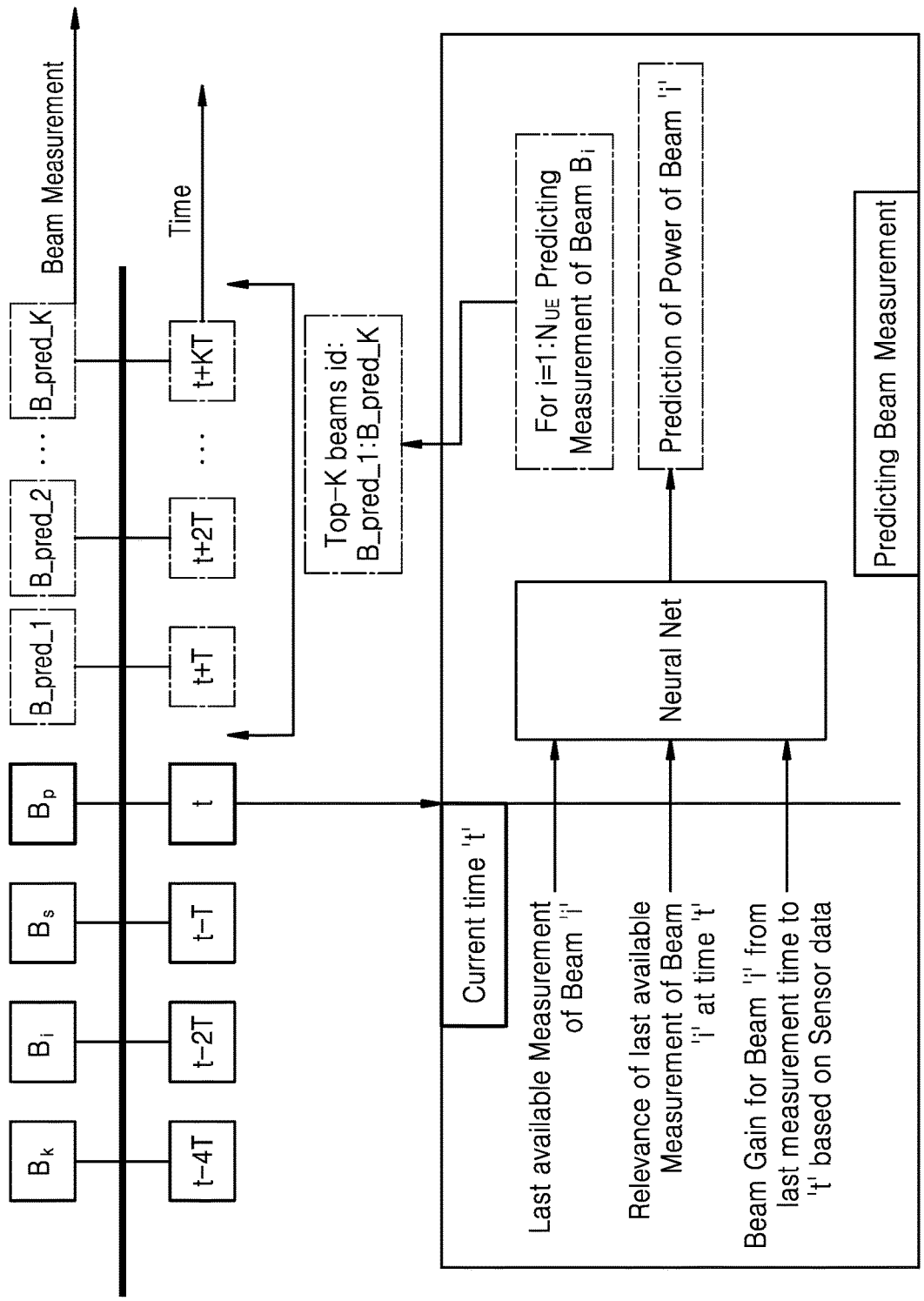
FIG. 16 depicts beam selection and beam scheduling based on Reference Signal Received Power (RSRP) prediction of the beams of the UE, using a neural network model, according to embodiments as disclosed herein.

FIG. 16 depicts beam selection and beam scheduling based on RSRP prediction of the beams using a neural network model, according to embodiments as disclosed herein. The neural network 602c can predict the RSRP of the beams of the UE 601. The UE 601 can select optimal beams for transmitting and receiving data, wherein the optimality of the beams can be determined based on the predicted RSRP associated with the beams. As depicted in FIG. 16, at a time instance 't', the neural network 602c predicts $B_p$ as the optimal beam. The neural network 602c can predict the beams, which are likely to be optimal at future time instances.

At time instance 't+T', neural network 602c predicts that the RSRP associated with all the beams of the UE 601 and determines that the RSRP associated with a beam B_pred_1 is the highest. The beam B_pred_1 is having the highest RSRP amongst all the beams of the UE 601 at time instance 't+T'. Similarly, the neural network 602c can predict that a beam B_pred_2 will be optimal at the time instance 't+2T', and beam B_pred_K will be optimal at the time instance 't+KT'. The neural network 602c had predicted that beams $B_s$, $B_j$, and $B_k$ were the optimal beams at time instances 't−T', 't−2T', and 't−4T', respectively.

The neural network 602c can utilize the previously previous beam measurement data such as RX beam pattern information, RSRP associated with the beams, beam orientation, and so on; beam gain pattern; and relevance of at a current time instance, to predict the RSRP associated with the beams of the UE 601. The neural network 602c can determine the pattern of variation in the gain of the beams during a time interval. The pattern can specify the gains of the beams when the beams were used previously and the gains of the beams at the current time instance. The neural network 602c can determine the relevance of previous beam measurement data at the current time instance. The relevance is based on correlation between the previous and current beam measurement data, for each of the beams. The UE 601 considers the beam with the highest predicted RSRP as the optimal beam at a time instance.

FIG. 17 is a flowchart 1700 depicting a method for training the neural network 602c, according to embodiments as disclosed herein. At step 1701, the method includes determining whether online training is enabled. If the online training is not enabled, the UE 601 does not update the weighs of the activation elements of different layers of the neural network 602c. If the online training is enabled, the UE 601 can determine optimal values of the weights and update the weighs of the activation elements with the optimal values. Usage of optimal weights can improve the accuracy of the predicted values of the CSI feedback parameters.

At step 1702, the method includes obtaining training data. The training data can include the predicted values of the feedback parameters, actual values of the feedback parameters, and measurement data. The predicted values are the probable values of the feedback parameters, which the feedback values are likely to assume at a future time instant. The actual values of the feedback parameters can be obtained by computing the values of the feedback parameters at the future time instant. In an example, the values of the feedback parameters, likely at a time instance 't+4', are predicted at a time instance 't', and the actual values are obtained by computing the values of the feedback parameters at the time instance 't+4'. The measurement data includes parameters stored in the database 602c, which include the baseband metrics, channel metrics, RX beam pattern information, and sensor measurements. The training data can also include block error rate, optimal Modulation and Coding (MCS) evaluated by the UE 601, MCS used by the gNB 607 for encoding PDSCH, feedback delay, and reporting periodicity.

At step 1703, the method includes updating the weights of the activation elements based on the training data. At step 1704, the method includes utilizing the updated values of the weights for predicting, at a current time instant 't', the probable values of the feedback parameters at a future time instance 't+i'. The predicted values of the feedback parameters can be sent to the gNB 607 in a CSI report. The gNB 607 can utilize the predicted values of the feedback parameters to schedule PDSCH. At step 1705, the method includes estimating the actual values of the feedback parameters at the time instance 't+i'. The predicted values and the estimated values can be considered as training data, which can be used for further refining of the weights of the neural network 602c.

The various actions in the flowchart 1700 may be performed in the order presented, in a different order, or simultaneously. Further, in some embodiments, some actions listed in FIG. 17 may be omitted.

FIG. 18 is a flowchart 1800 depicting a method for training the neural network 602c for predicting CQI, according to embodiments as disclosed herein. At step 1801, the method includes determining whether online training is enabled. If the online training is not enabled, the UE 601 does not update the weighs of the activation elements of different layers of the neural network 602c. If the online training is enabled, the UE 601 can determine optimal values of the weights and update the weighs of the activation elements with the optimal values. Usage of optimal weights can improve the accuracy of the predicted values of the CSI feedback parameters.

At step 1802, the method includes obtaining training data. The training data can include PDSCH transmission statistics for each CSI report. When online training is triggered, in addition to performing CQI prediction for reporting, the UE 601 can collect PDSCH transmission statistics. The PDSCH transmission statistics includes block error rate for PDSCH reception for each CSI report. In an example, the block error rate can be determined based on Cyclic Redundancy Check (CRC) pass and CRC fail. Thus, the block error rate can contribute to the training data collection of the UE 601. The training data further includes and previous predicted values of CQI the parameters stored in the database 602c, optimal MCS evaluated by the UE 601, MCS used by the gNB 607 for encoding PDSCH, feedback delay and reporting periodicity.

At step 1803, the method includes updating the weights of the neural network 602c based on the training data.

In an embodiment, performance optimization of the neural network 602c can be performed by the cloud server 608. The cloud server 608 can optimize the weights of the neural network 602c using the training data. This can reduce online training overhead for CQI. The UE 601 can send the training data (PDSCH transmission statistics, previous predicted values of CQI, parameters stored in the database 602c, optimal MCS evaluated by the UE 601, MCS used by the gNB 607 for encoding PDSCH, feedback delay, and reporting periodicity) to the cloud server 608. The cloud server 608 can determine the optimal values of the weights of the neural network 602c based on PDSCH transmission statistics, parameters stored in the database 602c, previous predicted values of the CQI, optimal MCS evaluated by the UE 601, MCS used by the gNB 607 for encoding PDSCH, feedback delay, and reporting periodicity. The cloud server 608 can send the determined values of the weights to the UE 601.

At step 1804, the method includes utilizing the updated values of the weights for predicting, at a current time instant, the probable values of CQI at a future time instance. The predicted values of CQI can be sent to the gNB 607 in a CSI report. The gNB 607 can utilize the predicted values of CQI to schedule PDSCH. At step 1805, the method includes determining the block error rate pertaining to PDSCH reception. The UE 601 can receive the PDSCH and determine the block error rate. The block error rate is used for further refining of the weights of the neural network 602c.

The various actions in the flowchart 1800 may be performed in the order presented, in a different order, or simultaneously. Further, in some embodiments, some actions listed in FIG. 18 may be omitted.

FIG. 19 is a flowchart 1900 depicting a method for training the neural network 602c for predicting PMI, according to embodiments as disclosed herein. At step 1901, the method includes determining whether online training is enabled. If the online training is not enabled, the UE 601 does not update the weighs of the activation elements of different layers of the neural network 602c. If the online training is enabled, the UE 601 can determine optimal values of the weights and update the weighs of the activation elements with the optimal values. Usage of optimal weights can improve the accuracy of the predicted values of the CSI feedback parameters.

At step 1902, the method includes obtaining training data. The training data can include PDSCH transmission statistics for each CSI report. The PDSCH transmission statistics includes block error rate for PDSCH reception for each CSI report. The training data further includes the parameters stored in the database 602c, previous predicted values of PMI optimal MCS evaluated by the UE 601, MCS used by the gNB 607 for encoding PDSCH, feedback delay, and reporting periodicity.

At step 1903, the method includes updating the weights of the neural network 602c based on the training data. The neural network 602c can be trained by a cloud server 608. The cloud server 608 can optimize the weights of the neural network 602c using the training data. The UE 601 can send the training data (PDSCH transmission statistics, parameters stored in the database 602c, optimal MCS evaluated by the UE 601, MCS used by the gNB 607 for encoding PDSCH, feedback delay, reporting periodicity and previous predicted values of PMI) to the cloud server 608.

For online training of the neural network 602c, for predicting the PMI, the cloud server 608 requires the assistance of the gNB 607, as the UE 601 may lack the information as to whether the gNB 607 had utilized the same PMI (value of the PMI predicted by the UE 601) as reported by the UE 601 or a different PMI. Therefore, the gNB 607 conveys the PMI used by the gNB 607 for scheduling the PDSCH to the cloud server 608, which is performing the training.

The previously predicted values of PMI, the PMI used by the gNB 607, and the training data, can be used for refining the weights of the neural network 602c. The cloud server 608 can determine the optimal values of the weights of the neural network 602c, and send the determined values to the UE 601.

At step 1904, the method includes utilizing the updated values of the weights for predicting, at a current time instant, the probable values of PMI at a future time instance. The method further includes sending the PMI to the gNB 607 in a CSI report. The gNB 607 can utilize the predicted value of PMI or another value of PMI to schedule the PDSCH. At step 1905, the method includes determining the block error rate after receiving the PDSCH from the gNB 607. Based on the block error rate, the neural network 602c can be trained further.

The various actions in the flowchart 1900 may be performed in the order presented, in a different order, or simultaneously. Further, in some embodiments, some actions listed in FIG. 19 may be omitted.

FIG. 20 is a flowchart 2000 depicting a method for predicting PMI using physical abstraction, for type-1 and type-2 CSI reporting, according to embodiments as disclosed herein. At step 2001, the method includes measuring parameters using CSI-RS and/or SSB. The parameters include channel metrics and baseband metrics. The embodiments include obtaining RX beam pattern information and sensor measurements (parameters measured by the sensors of the UE 601). The channel metrics, baseband metrics, RX beam pattern information and sensor measurements can be stored in the database 602c.

At step 2002, the method includes pre-processing the measured parameters for generating feature vectors. Information stored in the database 602c, such as channel metrics baseband metrics, RX beam pattern information, and sensor measurements, can be used for preprocessing. The preprocessing can lead to extraction of a plurality of feature vectors. The neural network 602c can compute a plurality of PMI values based on the extracted feature vectors.

At step 2003, the method includes predicting, at a current time instance, probable values of PMI at a future time instance. The neural network 602c can predict a plurality of probable values of PMI, wherein the predicted values are valid, as per feedback configuration received from the gNB 607. For type-1 or for type-2 CSI, PMI prediction with a high number of ports (16/32) can lead to prediction of a large number of valid PMI values. At step 2004, the method includes selecting a predefined number of PMI values, amongst the plurality of predicted values, for reporting to the gNB 607. The predefined number of PMI values can be selected based on probabilities of the plurality of probable values of PMI being the actual value of the PMI at the future time instance.

At step 2005, the method includes, determining a most probable PMI value amongst the predefined number of PMI values. In an embodiment, physical abstraction method can be used for determining the most probable PMI value amongst the predefined number of PMI values. For example, Mutual information can be used for determining the most probable PMI value, wherein average mutual information of the most probable PMI value is highest, compared to the average mutual information of the other predefined number of PMI values.

The physical abstraction can reduce computational complexity of the PMI prediction. Consider that M is the total number of PMI hypotheses (predicted values), and K values are selected. The computational complexity is reduced by a factor K/M.

At step 2006, the method includes generating a Discrete Fourier Transform (DFT) beam, amplitude coefficients and phase coefficients based on the most probable PMI value. At step 2007, the method includes reporting the DFT beam, amplitude coefficients and phase coefficients, to the gNB 607.

The various actions in the flowchart 2000 may be performed in the order presented, in a different order, or simultaneously. Further, in some embodiments, some actions listed in FIG. 20 may be omitted.

FIG. 21 is a flowchart 2100 depicting a method for predicting PMI using Eigen vectors, for type-1 and type-2 CSI reporting, according to embodiments as disclosed herein. At step 2101, the method includes measuring parameters using CSI-RS and/or SSB. The parameters include channel metrics and baseband metrics. The embodiments include obtaining RX beam pattern information and sensor measurements (parameters measured by the sensors of the UE 601). The channel metrics, baseband metrics, RX beam pattern information and sensor measurements can be stored in the database 602c.

At step 2102, the method includes pre-processing the measured parameters for generating feature vectors. Information stored in the database 602c can be used for preprocessing. The preprocessing can lead to extraction of a plurality of feature vectors. The neural network 602c can compute a plurality of PMI values based on the extracted feature vectors.

At step 2103, the method includes determining a dominant Eigen vector, corresponding to the channel metrics and computing a valid PMI values which is having a high degree of correlation to the dominant Eigen vector. At step 2104, the method includes quantizing the dominant Eigen vector to the closest valid PMI, as per gNB 607 type-2 configuration. In an embodiment, the dominant Eigen vector can be quantized using inner product.

At step 2105, the method includes generating a DFT beam, amplitude coefficients and phase coefficients, based on the quantized dominant Eigen vector. At step 2106, the method includes reporting the amplitude coefficients, phase coefficients, and DFT beam, to the gNB 607.

The various actions in the flowchart 2100 may be performed in the order presented, in a different order, or simultaneously. Further, in some embodiments, some actions listed in FIG. 21 may be omitted.

FIG. 22 schematically illustrates the base station according to embodiments of the present disclosure.

Referring to the FIG. 22, the Base station 2200 may include a processor 2210, a transceiver 2220 and a memory 2230. However, all of the illustrated components are not essential. The Base station 2200 may be implemented by more or less components than those illustrated in FIG. 22. In addition, the processor 2210 and the transceiver 2220 and the memory 2230 may be implemented as a single chip according to another embodiment.

The gNB described above may correspond to the base station 2200. The gNB 607 illustrated in FIG. 6A may correspond to the base station 2200.

The aforementioned components will now be described in detail.

The processor 2210 may include one or more processors or other processing devices that control the proposed function, process, and/or method. Operation of the Base station 2200 may be implemented by the processor 2210.

The transceiver 2220 may include a RF transmitter for up-converting and amplifying a transmitted signal, and a RF receiver for down-converting a frequency of a received signal. However, according to another embodiment, the transceiver 2220 may be implemented by more or less components than those illustrated in components.

The transceiver 2220 may be connected to the processor 2210 and transmit and/or receive a signal. The signal may include control information and data. In addition, the transceiver 2220 may receive the signal through a wireless channel and output the signal to the processor 2210. The transceiver 2220 may transmit a signal output from the processor 2210 through the wireless channel.

The memory 2230 may store the control information or the data included in a signal obtained by the Base station 2200. The memory 2230 may be connected to the processor 2210 and store at least one instruction or a protocol or a parameter for the proposed function, process, and/or method. The memory 2230 may include read-only memory (ROM) and/or random access memory (RAM) and/or hard disk and/or CD-ROM and/or DVD and/or other storage devices.

FIG. 23 illustrates a user equipment (UE) according to embodiments of the present disclosure.

Referring to the FIG. 23, the UE 2300 may include a processor 2310, a transceiver 2320 and a memory 2330. However, all of the illustrated components are not essential. The UE 2300 may be implemented by more or less components than those illustrated in FIG. 23. In addition, the processor 2310 and the transceiver 2320 and the memory 2330 may be implemented as a single chip according to another embodiment.

The UE described above may correspond to the UE 2300. For example, the UE 601 illustrated in FIG. 6A may correspond to the UE 2300. Also, the processor 602 and sensor unit 605 illustrated in FIG. 6A may correspond to the processor 2310. The communication Interface 603 illustrated in FIG. 6A may correspond to the transceiver 2320. The memory 602 illustrated in FIG. 6A may correspond to the memory 2330. Also, UE 2300 may further include a display (Not shown) such as the display 606 illustrated in FIG. 6A.

The aforementioned components will now be described in detail.

The processor 2310 may include one or more processors or other processing devices that control the proposed function, process, and/or method. Operation of the UE 2300 may be implemented by the processor 2310.

The transceiver 2320 may include a RF transmitter for up-converting and amplifying a transmitted signal, and a RF receiver for down-converting a frequency of a received signal. However, according to another embodiment, the transceiver 2320 may be implemented by more or less components than those illustrated in components.

The transceiver 2320 may be connected to the processor 2310 and transmit and/or receive a signal. The signal may include control information and data. In addition, the transceiver 2320 may receive the signal through a wireless channel and output the signal to the processor 2310. The transceiver 2320 may transmit a signal output from the processor 2310 through the wireless channel.

The memory 2330 may store the control information or the data included in a signal obtained by the UE 2300. The memory 2330 may be connected to the processor 2310 and store at least one instruction or a protocol or a parameter for the proposed function, process, and/or method. The memory 2330 may include read-only memory (ROM) and/or random access memory (RAM) and/or hard disk and/or CD-ROM and/or DVD and/or other storage devices.

The embodiments disclosed herein can be implemented through at least one software program running on at least one hardware device and performing network management functions to control the network elements. The network elements shown in FIGS. 6A and 6B include blocks which can be at least one of a hardware device, or a combination of hardware device and software module.

The embodiments disclosed herein describe methods and systems for reporting CSI to a gNB, by a UE, wherein the CSI report can include parameters that are computed and predicted using ML based learning models. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in, for example, Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an Application-Specific Integrated Circuit (ASIC), or a combination of hardware and software means, example an ASIC and a Field Programmable Gate Array (FPGA), or at least one microprocessor and at least one memory with software modules located therein. The method embodiments described herein could be implemented partly in hardware and partly in software. Alternatively, the 23 may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for generating channel state information (CSI) reports by a user equipment (UE), the method comprising:
   determining a plurality of radio parameters for a connection between the UE and a base station;
   computing values of CSI feedback parameters at a current time instance based on the determined plurality of radio parameters;
   predicting probable values of the CSI feedback parameters at a future time instance;
   generating a CSI report, by compiling at least one of the computed values of the CSI feedback parameters and the predicted values the CSI feedback parameters; and
   transmitting the CSI report to the base station,
   wherein the UE comprises a neural network, and
   wherein the neural network is trained to minimize a cost function, for fitting the generated CSI report between periodic CSI reporting slots.

2. The method of claim 1, wherein the plurality of radio parameters comprises at least one of at least one CSI-Reference Signal (CSI-RS), or at least one Synchronization Signal Block (SSB).

3. The method of claim 1,
wherein the cost function is minimized in case that the predicted values of the feedback parameters at the future time instance match actual values of the feedback parameters at the future time instance, and
wherein the neural network is trained in one of the UE and a cloud server.

4. The method of claim 1, further comprising:
generating a plurality of CSI reports by at least one of computing or predicting probable values of the feedback parameters at a plurality of future time instances, and,
wherein the plurality of CSI reports are transmitted to the base station in one of a single reporting slot and a plurality of periodic reporting slots.

5. The method of claim 1, wherein generating the CSI report comprises encoding the compiled at least one of the computed values of the CSI feedback parameters and the predicted values the CSI feedback parameters.

6. The method of claim 1, wherein computing the values of CSI feedback parameters comprises:
computing reference signal received power (RSRP) associated with a plurality of beams of the UE at the current time instance, for determining an optimal beam at the current time instance and predicting optimal beams at the future time instances.

7. The method of claim 1, further comprising:
determining an optimal CSI-RS resource allocation and an optimal periodicity for transmitting CSI reports to the base station, based on variation in a condition of a channel between the UE and the base station; and
transmitting, by the UE, to the base station, the optimal CSI-RS resource allocation and the optimal periodicity for transmitting CSI reports to the base station.

8. The method of claim 1,
wherein the UE comprises a neural network, and
wherein the neural network model is one of: a hierarchical model, a cascaded model, a joint neural network model, or a deep neural network (DNN) model comprising of fully connected layers and convolutional layers.

9. The method of claim 1,
wherein one of the CSI feedback parameters is a precoding matrix indicator (PMI),
wherein a most probable PMI value is determined amongst a predefined number of probable PMI values, and
wherein the predefined number of PMI values are selected amongst a plurality of predicted PMI values.

10. The method of claim 1,
wherein one of the CSI feedback parameters is a PMI, and
wherein predicting probable values of the CSI feedback parameters comprises:
determining a dominant Eigen vector amongst a plurality of Eigen vectors, wherein the dominant Eigen vector is determined based on a plurality of feature vectors generated based on content derived from at least one of at least one CSI-RS and at least one SSB;
quantizing the dominant Eigen vector to a nearest valid PMI value, wherein the base station provides a plurality of valid PMI values to the UE; and
generating at least one of a discrete fourier transform (DFT) beam, amplitude coefficients and phase coefficients, based on the quantized dominant Eigen vector, wherein the predicted value of PMI comprises at least one of the DFT beam, amplitude coefficients and phase coefficients.

11. The method of claim 1, wherein the probable values of the CSI feedback parameters at the future time instance is determined based on a plurality of radio resources received at a plurality of time instances.

12. The method of claim 1, wherein the plurality of radio parameters are one of measured by the UE and received from the base station.

13. A user equipment (UE) for generating channel state information (CSI) reports, the UE comprising:
a transceiver;
a processor; and
a memory configured to store instructions that, when executed by the processor, cause the processor to:
determine a plurality of radio parameters for a connection between the UE and a base station,
compute values of CSI feedback parameters at a current time instance based on the determined plurality of radio parameters,
predict probable values of the CSI feedback parameters at a future time instance,
generate a CSI report, by compiling at least one of the computed values of the CSI feedback parameters and the predicted values the CSI feedback parameters; and
control the transceiver to transmit the CSI report to the base station,
wherein the UE comprises a neural network, and
wherein the neural network is trained to minimize a cost function, for fitting the generated CSI report between periodic CSI reporting slots.

14. The UE of claim 13, wherein the plurality of radio parameters comprises at least one of at least one CSI-Reference Signal (CSI-RS), or at least one Synchronization Signal Block (SSB).

15. The UE of claim 13,
wherein the processor is further configured to generate a plurality of CSI reports by at least one of computing or predicting probable values of the feedback parameters at a plurality of future time instances, and
wherein the plurality of CSI reports are transmitted to the base station in one of a single reporting slot and a plurality of periodic reporting slots.

16. The UE of claim 13,
wherein the cost function is minimized in case that the predicted values of the feedback parameters at the future time instance match actual values of the feedback parameters at the future time instance, and
wherein the neural network is trained in one of the UE and a cloud server.

17. The UE of claim 13, wherein the processor is further configured to encode the compiled at least one of the computed values of the CSI feedback parameters and the predicted values the CSI feedback parameters.

18. The UE of claim 13, wherein the processor is further configured to compute reference signal received power (RSRP) associated with a plurality of beams of the UE at the current time instance, for determining an optimal beam at the current time instance and predicting optimal beams at the future time instances.

19. The UE of claim 13, wherein the processor is further configured to:
determine an optimal CSI-RS resource allocation and an optimal periodicity for transmitting CSI reports to the base station, based on variation in a condition of a channel between the UE and the base station, and transmit, by the UE, to the base station, the optimal CSI-RS resource allocation and the optimal periodicity for transmitting CSI reports to the base station.

20. The UE of claim 13, wherein the neural network model is one of: a hierarchical model, a cascaded model, a joint neural network model, or a deep neural network (DNN) model comprising of fully connected layers and convolutional layers.

* * * * *